(12) United States Patent
Hainberger et al.

(10) Patent No.: US 12,140,426 B2
(45) Date of Patent: Nov. 12, 2024

(54) OPTICAL COHERENCE TOMOGRAPHY SYSTEM

(71) Applicant: AIT AUSTRIAN INSTITUTE OF TECHNOLOGY GMBH, Vienna (AT)

(72) Inventors: Rainer Hainberger, Vienna (AT); Stefan Nevlacsil, Vienna (AT)

(73) Assignee: AIT AUSTRIAN INSTITUTE OF TECHNOLOGY GMBH, Vienna (AT)

( * ) Notice: Subject to any disclaimer, the term of this patent is extended or adjusted under 35 U.S.C. 154(b) by 128 days.

(21) Appl. No.: 17/598,000

(22) PCT Filed: Jul. 31, 2020

(86) PCT No.: PCT/EP2020/071620
§ 371 (c)(1),
(2) Date: Feb. 1, 2022

(87) PCT Pub. No.: WO2021/023642
PCT Pub. Date: Feb. 11, 2021

(65) Prior Publication Data
US 2022/0290970 A1 Sep. 15, 2022

(30) Foreign Application Priority Data
Aug. 2, 2019 (EP) .................................... 19189873

(51) Int. Cl.
*G01B 9/02091* (2022.01)
*G01B 9/02* (2022.01)
*G01B 9/02015* (2022.01)

(52) U.S. Cl.
CPC ..... *G01B 9/02091* (2013.01); *G01B 9/02027* (2013.01); *G01B 9/02051* (2013.01); *G01B 2290/70* (2013.01)

(58) Field of Classification Search
CPC ............ G01B 9/02027; G01B 9/02051; G01B 9/02091; G01B 2290/70
See application file for complete search history.

(56) References Cited

U.S. PATENT DOCUMENTS 6,307,633 B1 * 10/2001 Mandella ............... A61B 3/102
356/485
2011/0205548 A1 * 8/2011 Sugita .................. A61B 5/7242
356/496

(Continued)

FOREIGN PATENT DOCUMENTS

CN 103815868 A * 5/2014
WO 2018055606 A1 3/2018

OTHER PUBLICATIONS

Rank, Elisabet A. et al. "Spectral domain and swept source optical coherence tomography on a photonic integrated circuit at 840nm for ophthalmic application". Proc. SPIE 11078, Optical Coherence Imaging Techniques and Imaging in Scattering Media III, 110780U (Jul. 19, 2019). (Year: 2019).*

(Continued)

*Primary Examiner* — Michael A Lyons
(74) *Attorney, Agent, or Firm* — Greer, Burns & Crain, Ltd

(57) ABSTRACT

A time-domain or frequency domain system includes, a sample light path between a source interface and a detector interface, a reference light path between the source interface and the detector interface, and a photonic integrated circuit, wherein the reference light path is at least partially separate from the sample light path, wherein the sample light path includes a forward sample light path between the source interface and a sample interface, and a backward sample light path between the sample interface and the detector interface, wherein the forward sample light path and the backward sample light path are at least partially provided by (Continued)

the photonic integrated circuit, and wherein the photonic integrated circuit includes an integrated sample-side polarization beam splitter arranged in the forward sample light path and the backward sample light path.

13 Claims, 14 Drawing Sheets

(56) References Cited

U.S. PATENT DOCUMENTS

| | | | |
|---|---|---|---|
| 2014/0125987 A1* | 5/2014 | Flanders | G01B 9/02059 |
| | | | 356/479 |
| 2014/0376000 A1 | 12/2014 | Swanson et al. | |
| 2016/0038023 A1* | 2/2016 | Endo | A61B 3/10 |
| | | | 351/221 |
| 2019/0078872 A1* | 3/2019 | Kim | G01B 9/02015 |

OTHER PUBLICATIONS

International Search Report and Written Opinion received for PCT/EP2020/071620, mailed Nov. 17, 2020.

Ding, Y., et al., "Wideband polarization splitter and rotator with large fabrication tolerance and simple fabrication process," Optics Letters, vol. 38, No. 3, 2013, pp. 1227-1229.

Schneider, S., et al., "Optical coherence tomography system massproducible on a silicon photonic chip," Optics Express 1573, vol. 24, No. 2, 2016, 14 pages.

Wang, J., et al., "Novel ultra-broadband polarization splitterrotator based on mode-evolution tapers and a mode-sorting asymmetric Y-junction," Optics Express 13565, vol. 22, No. 11, 2014, 7 pages.

Wang, Z., et al., "Silicon photonic integrated circuit swept-source optical coherence tomography receiver with dual polarization, dual balanced, in-phase and quadrature detection," Biomedical Optics Express, vol. 6, No. 7, 2015, 13 pages.

* cited by examiner

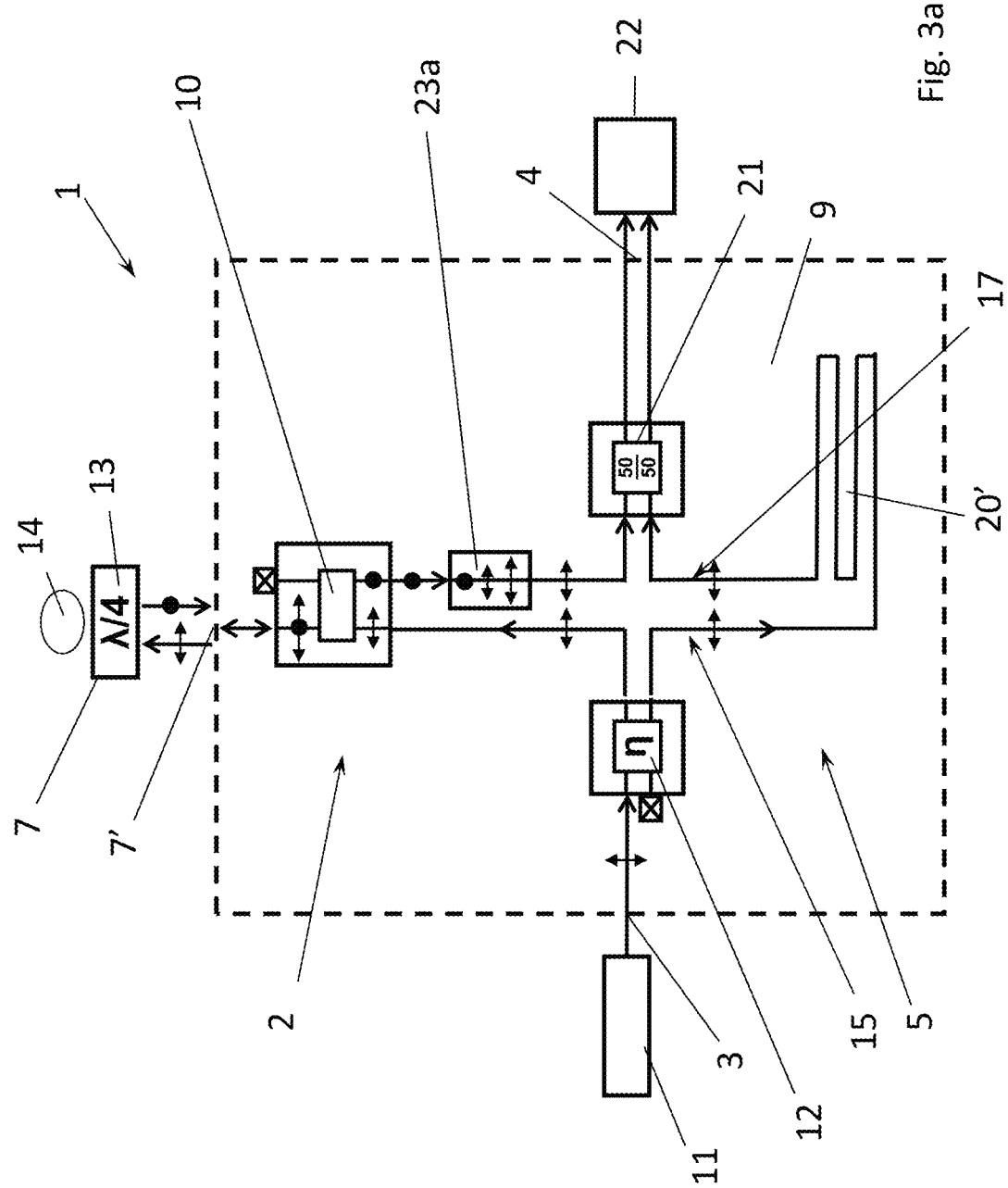

OPTICAL COHERENCE TOMOGRAPHY SYSTEM

BACKGROUND

The invention relates to a time-domain or frequency domain, in particular swept-source, optical coherence tomography system comprising: a sample light path between a source interface and a detector interface; a reference light path between the source interface and the detector interface, and a photonic integrated circuit, wherein the reference light path is at least partially separate from the sample light path, wherein the sample light path comprises a forward sample light path between the source interface and a sample interface, and a backward sample light path between the sample interface and the detector interface, wherein the forward sample light path and the backward sample light path are at least partially provided by the photonic integrated circuit.

The project leading to this application has received funding from the European Union's Horizon 2020 research and innovation programme under grant agreement No 688173.

Optical coherence tomography (OCT) is an imaging technique that enables non-invasive cross-sectional imaging of tissue with micrometer resolution and material characterization by nondestructive examination. OCT is a medical diagnostic tool with significant impact in ophthalmology and dermatology. There are three different OCT approaches, which are time-domain (TD), spectral domain (SD; also referred to as frequency-domain, FD) and swept-source (SS), wherein SS is a variant of SD. SS-OCT is known to offer an advantage in terms of scan speed and signal quality and has become the most relevant for medical diagnostic applications, in particular in the ophthalmic field, with the emergence of highly compact swept laser sources and their ongoing improvements in terms of performance, size and cost.

Most state-of-the-art OCT systems are purely made of discrete optical components and suffer from large size, limitations in scan speed and high cost, which prevents a more widespread use, e.g. in the clinical routine in a decentralized way. Efforts have been made in realizing functional parts of OCT systems as photonic integrated circuits. However, these systems do not take full advantage of the potential of integration in respect of an improvement of performance of the overall system.

For example, "Silicon photonic integrated circuit swept-source optical coherence tomography receiver with dual polarization, dual-balanced, in-phase and quadrature detection" by Wang et al, 1 Jul. 2015, Biomedical Optics Express Vol. 6, No. 7, pp. 2562-2574, shows a silicon photonic integrated receiver. The photonics integrated receiver has a sample input and a reference input, which are each first separated into X and Y polarization channels by a polarization beam splitter. The reference signal of each polarization channel is further split into in-phase and quadrature components and mixed with the sample input, then coupled into four separate photodetectors. This system, from the inputs up to and including the photodetectors, is contained in a single silicon photonic integrated circuit. It is disadvantageous in this system, that a path from a source laser to the sample and the optical elements, such as circulators, necessary in such a path are not integrated. The implementation of these elements in the form of discrete optical elements results, among others, in higher maintenance, larger size and higher costs.

Especially in ophthalmic applications of OCT, the power of the incoming sample beam is very limited to avoid damaging the sample, i.e. the eye. The integrated optical approaches demonstrated so far all suffer from inherent optical losses, in particular when separating the optical paths of the incoming light from the light backscattered from the sample, such that the low power of the backscattered light, which is already limited, is further diminished. This reduces the signal-to-noise ratio and, thus, image quality. Furthermore, the current integrated systems are only partially implemented with photonic integrated circuits and require multiple discrete components, which results in larger sizes and higher costs, both for the cost of the discrete component and the more complex assembly, of the system. Additionally, current integrated systems suffer significant losses and have a very limited scalability with regard to the number of parallel channels or have no possibility for parallelization, i.e. they use a single channel only. This further degrades achievable image quality as, in particular for medical diagnostics, where sampling times correspond to chair time (i.e. the amount of time a patient spends in the chair of a health-care provider for examination or treatment), sampling time cannot be arbitrarily extended without suffering a blurring of the image, e.g. due to patient movement.

It is an objective of the present invention to alleviate or reduce the problems stated above. In particular, it is an objective of the present invention to provide a compact, efficient, cost-efficiently producible and scalable OCT system or such a component to be used in an OCT system. Furthermore, it is an objective of the present invention to provide for an OCT system with a high image quality at a short sampling time. The inventive OCT system should advantageously allow for a broader application of this technology in the medical diagnostics (in particular in the context of decentralised medical care and near patient diagnostics) and other fields such as material probing and the surveillance of manufacturing processes.

SUMMARY

The present disclosure provides a system as described in the outset, wherein the photonic integrated circuit comprises an integrated sample-side polarization beam splitter arranged in the forward sample light path and the backward sample light path.

Providing for an integrated sample-side polarization beam splitter not only in the backward sample light path i.e. for a polarization diversity scheme but also in the forward sample light allows reducing the optical losses by utilizing the polarization beam splitter as optical path separator by rotating the polarization of the backward sample light by 90° compared to the forward sample light. This avoids inherent losses resulting from the use of a conventional power splitter to separate the forward from the backward sample light paths. The lower optical losses of the polarization beam splitter as optical path separating scheme, especially for the low intensity backreflected light from the sample, increase the signal-to-noise ratio and, thus, image quality. Providing this optical path separating element on the photonic integrated circuit further facilitates production of the OCT system, allows to reduce maintenance and improves the scalability concerning power budget, space requirements and component costs, especially when increasing the number of channels.

Preferably, the OCT system is an SS-OCT system. The OCT system may comprise a detector, e.g. a photodiode or (in particular for FD OCT with a broadband light source) a spectrometer, and/or a light source, in particular a frequency-swept laser (if the OCT is SS), e.g. an Exalos, ESS320016 (central wavelength: 840 nm; sweep rate: 100 kHz; bandwidth: 60 nm; average output power: 8 mW; coherence length in air: 4 mm), and/or a reference. The light source may be integrated on the photonic integrated circuit or not. A homogeneous or a heterogeneous integration of the light source is possible. However, the OCT system may also be used as one component in a setting and as such, itself, does not need to comprise a light source, a detector and/or a reference, but can also only be suitable for coupling with the light source and/or the detector and/or the reference, or for being used with them. The source interface is suitable for coupling in a light beam from the light source or for coupling the respective light path(s) with the light source. The detector interface is suitable for coupling out a light beam to the detector or detectors or for coupling the respective light path(s) with a detector or detectors. The sample interface is suitable for coupling out a light beam (from the sample light path or, in particular, the forward sample light path) to a sample and for coupling in a light beam from the sample (into the sample light path or, in particular, the backward sample light path). The source interface and/or the detector interface may be external interfaces or may be integrated, i.e. the light source and/or the detector may also be integrated on the photonic integrated circuit. The sample interface may be an external interface or may be integrated. The material platform for the photonic integrated circuit can for example be SiN waveguides with SiO2 as cladding material on top of a silicon wafer.

The reference light path can partially be integral with the sample light path, e.g. they can share the source interface and/or the detector interface, and preferably a light path section immediately after the source interface and/or immediately before the detector interface. The terms "between", "before" and "after" refer to the optical path and the direction of a wanted/desired signal. The forward sample light path and the backward sample light path are preferably at least partially integral with each other and/or at least partially separate from one another. Particularly preferably the forward sample light path and the backward sample light path overlap (i.e., are integral with each other) between the sample-side polarization beam splitter and the sample interface. Advantageously, the sample-side polarization beam splitter acts to split the forward sample light path and the backward sample light path from one another after a common light path section. I.e., it is preferable if a sample (light) beam in the sample light path first is lead in the forward sample light path from the source interface via the polarization beam splitter to the sample interface and, e.g. after interacting with the sample and/or other components and thus altering its polarization, is lead the same common light path section back to the polarization beam splitter in the backward sample light path, where the backward sample light path splits from the forward sample light path and the sample beam is lead along the backward sample light path (now being distinct from the forward sample light path) to the detector interface. It is noted that the sample light path, which is the sum of the forward sample light path and backward sample light path, will usually not comprise a closed waveguide path from the source interface to the detector interface, i.e. the waveguide can be intermittent and the respective light path(s) can comprise a freespace path, in particular when coupling the sample beam out of the photonic integrated circuit before the sample interface and on return back into the photonic integrated circuit after the sample interface. However, optionally, the forward sample light path and/or the backward sample light path may be completely provided by the photonic integrated circuit. Preferably, the reference light path is at least partially, preferably completely, provided by the photonic integrated circuit.

Under polarization beam splitter is understood any device that guides incoming light arriving at one or more inputs to at least two outputs depending on the polarization or polarization components of the light. (Conversely, the outputs can also act as inputs according to this definition and vice-versa.) The sample-side polarization beam splitter can for example be a beamsplitting polarizer or a multi-functional component, i.e. for example a polarization splitter combined with a polarization rotating function ("polarization splitter rotator").

In an advantageous embodiment, the photonic integrated circuit comprises an integrated input beam splitter arranged in the forward sample light path and in the reference light path. Under beam splitter is understood any device that distributes incoming light arriving at one or more inputs to at least two outputs, usually according to a predefined distribution ratio. Preferably, the forward sample light path and the reference light path overlap before the input beam splitter, in particular between the source interface and the input beam splitter, are subsequently split by the input beam splitter and are separate from each other (e.g. spaced apart) after the input beam splitter. Equivalently, preferably, the forward sample light path and the reference light path each comprise the same input of the input beam splitter, but comprise different outputs of the input beam splitter. I.e., an input beam is coupled into the forward sample light path and the reference light path at the source interface, is lead to the input beam splitter and is split into the sample beam lead along the forward sample light path and a reference beam lead along the reference light path, wherein the forward sample light path and the reference light path are separate from the input beam splitter onwards. The input beam splitter can for example be a broadband 2×2 90:10 coupler, wherein preferably the forward sample light path comprises the 90%-output of the input beam splitter and the reference light path comprises the 10%-output. The splitting ratio can in particular be chosen based on the different paths' propagation losses, the detectors' sensitivities, coupling losses and the back-scattering strength from the sample (interface).

It is preferable if the system further comprises a sample-side polarization changing element for rotating the polarization axis of linearly polarized light by 90° after a forward and backward pass, wherein the sample-side polarization changing element is arranged in the forward sample light path and the backward sample light path between the integrated sample-side polarization beam splitter and the sample interface. Thus, the polarization beam splitter can direct the sample beam having passed the sample-side polarization changing element twice (once forwards in the forward sample light path and once backwards in the backward sample light path, which paths at this point are preferably overlapping with each other) into the backward sample light path and thus can separate the forward sample light path and the backward sample light path at this point. This approach allows for an easy separation of the forward sample light path and the backward sample light path and allows reducing optical loss. For example the sample beam can be in a transverse electric mode in the forward sample light path between the sample-side polarization beam splitter (or even the source interface) and the sample-side polarization changing element and in a transverse magnetic mode in the backward sample light path between the sample-side polarization changing element and the detector interface. The sample-side polarization changing element can be integrated on the photonic integrated circuit or provided by the photonic integrated circuit. In this description the terms "transverse electric mode" and "transverse magnetic mode" serve as synonyms for "transverse electric like mode" and "transverse magnetic like mode".

In an advantageous embodiment, the sample-side polarization changing element is a quarter wave plate. In another advantageous embodiment, the sample-side polarization changing element is a Faraday rotator that rotates the polarization axis of a linearly polarized light beam by 45° after a single pass. Both of these components lead to a rotation of the polarization axis of linearly polarized light by 90° after two passes in alternating directions and are particularly efficient and easy to implement. Thus, the sample-side polarization beam splitter can direct the sample beam after having passed the sample-side polarization changing element twice (i.e. usually after having interacted with the sample) to the backward sample light path and prevent the backscattered sample beam from passing (via the forward sample light path) back to the source interface.

It is preferable that the reference light path comprises a forward reference light path between the source interface and a reference interface, and a backward reference light path between the reference interface and the detector interface, and in that the photonic integrated circuit further comprises an integrated reference-side polarization beam splitter arranged in the forward reference light path and the backward reference light path. The reference-side polarization beam splitter allows separating the forward reference light path and the backward reference light path from each other apart from a section of the reference light path common to the forward reference light path and the backward reference light path. Providing one reference-side polarization beam splitter in both the forward reference light path and the backward reference light path and providing it by the photonic integrated circuit allow for a particularly compact, cost efficiently producible and efficient OCT system. Optical loss can be minimized by providing for an integrated reference-side polarization beam splitter. Usually, the forward reference light path is partially separate from and partially overlapping with the backward reference light path. In particular, they are integral with one another between the reference interface and the reference-side polarization beam splitter and distinct from one another everywhere else. The sample-side polarization beam splitter and/or the reference-side polarization beam splitter can be polarization splitter rotators.

The sample-side or, respectively, reference-side polarization beam splitters are meant to separate the respective forward and the respective backward light paths, wherein the forward and the backward light beams can be distinguished by their different polarisations, which is e.g. due to the respective polarisation changing element. However, there can be reflections at the chip-air boundary (i.e. when the light beam leaves the photonics integrated circuit into free space), which then come back with the same polarization as the forward light beam and would be suppressed by the polarization beam splitter into the backwards path. However, if this suppression is not high enough, another polarization splitter can be used to further suppress this unwanted reflection. (Furthermore, but less significantly, there can be some reflection of the respective forward light beam from the respective polarization beam splitter, thus entering the respective backward light path. Therefore, some fraction of the light beam would be directly guided to the detector interface, i.e. without interfering with the sample/reference, which is detrimental to the signal-to-noise ratio if the path length of the reference and sample side reflection would be similar in length.) More specifically, to suppress these unwanted reflections in order to reduce their negative impact, the sample-side polarization beam-splitter and/or the reference-side polarization beam splitter can be configured in a double-stage arrangement, i.e. there can be provided for another respective polarization beam splitter, which is arranged in the respective backward light path after the respective (first/original) polarization beam splitter. This other (second/additional) polarization beam splitter can prevent the fraction of the respective forward light beam that was reflected at the respective chip-air boundary (or, less significantly, the respective polarization beam splitter) from reaching the detector interface.

Preferably, the system further comprises a reference-side polarization changing element for rotating the polarization axis of linearly polarized light by 90° after a forward and a backward pass, wherein the reference-side polarization changing element is arranged in the forward reference light path and the backward reference light path between the integrated reference-side polarization beam splitter and the reference interface. This means that the polarization axis of a (reference) light beam arriving at the reference-side polarization beam splitter from the direction of the source interface will differ from the polarization axis of a light beam arriving there from the direction of the reference interface by 90°. Thus, a reference beam backreflected through the reference interface (e.g. from the reference) can be directed along the backward reference light path by the reference-side polarization beam splitter and can be prevented from coupling back to the source interface via the forward reference light path. The reference side polarization changing element may be a quarter wave plate or the reference side polarization changing element may be a Faraday rotator that rotates the polarization axis of a linearly polarized light beam by 45° after a single pass. The reference-side polarization changing element can be integrated on the photonic integrated circuit or provided by the photonic integrated circuit.

In an alternative embodiment, the reference light path is integrated on the photonic integrated circuit between the source interface and the detector interface. E.g., the reference light path is fully integrated with the photonic integrated circuit. Thus, for example also the reference can be fully integrated. In this way, a particularly compact system can be obtained and optical losses from interfaces between the photonic integrated circuit and discrete optical components can be avoided. In this case the reference light path can be a one-directional light path, i.e. there is substantially no light backreflected from the reference in the direction of the source interface or at least the desired/wanted light beam does not travel along the same path twice. Thus, there is also no need to separate a forward and a backward reference light path and, therefore, there is also no need for a reference-side polarization beam splitter.

In this context, the photonic integrated circuit may comprise a sample-side polarization rotating element ("rotator") for rotating one polarization eigenmode by 90° into the orthogonal polarization eigenmode arranged in the backward sample light path between the integrated sample-side polarization beam splitter and the detector interface or in the forward sample light path between the source interface and the sample-side polarization beam splitter or, alternatively, the sample-side polarization beam splitter is a (combined) polarization splitter rotator. I.e., the sample-side polarization beam splitter can also be combined with a polarization rotating function. The polarization splitter rotator can be arranged such that the function of rotating one polarization eigenmode by 90° into the orthogonal polarization eigenmode occurs only during one pass, i.e. only during the forward pass or only during the backward pass. The sample-side polarization rotating element may, for example, be for rotating the polarization axis of a linearly polarized light beam by 90°. In case of the sample-side polarization changing element, there is no necessity for a reference-side polarization changing element, since the sample-side polarization rotating element can bring the sample beam in the appropriate state for interference of the sample beam with the reference beam, particularly if there is a sample-side polarization changing element for rotating the polarization axis of linearly polarized light by 90° after a forward and a backward pass.

In an alternative embodiment in the same context, the photonic integrated circuit may comprise a reference-side polarization rotating element ("rotator") for rotating one polarization eigenmode by 90° into the orthogonal polarization eigenmode arranged in the reference light path. For example, more concretely, the reference-side polarization rotating element may be for rotating the polarization axis of a linearly polarized light beam by 90°. In this way, an easy integration in the photonic integrated circuit can be achieved. This embodiment, as well as the alternative embodiment comprising the sample-side polarization changing element or the sample-side combined polarization splitter rotator, is particularly well suited for the reference light path to be one-directional and for there to be no need to couple the reference light beam out and into the photonic integrated circuit and to split the reference light path into a forward reference light path and a backward reference light path. The reference-side polarization rotating element can bring the reference beam in the appropriate polarization state for interference with the sample beam, particularly if there is a sample-side polarization changing element for rotating the polarization axis of linearly polarized light by 90° after a forward and a backward pass. In particular, the reference polarization rotating element can be a polarization splitter rotator, which is particularly easy to implement in the photonic integrated circuit. For example, this could be implemented such as it is described in Yunhong Ding et al, "Wideband polarization splitter and rotator with large fabrication tolerance and simple fabrication process", Opt. Lett. 38, 1227-1229 (2013) or in Jing Wang et al, "Novel ultra-broadband polarization splitter-rotator based on mode-evolution tapers and a mode-sorting asymmetric Yjunction," Opt. Express 22, 13565-13571 (2014).

It is preferable if the photonic integrated circuit comprises an integrated broadband output coupler arranged in the backward sample light path and in the reference light path. Thus, the reference beam and the sample beam can be combined and can be brought into interference (e.g. in the integrated broadband output coupler and before reaching the detector). Under output coupler (or more specifically, output interference coupler) is understood any device that receives incoming light arriving at two or more inputs, brings this light to interference and guides the resulting light to at least one output, optionally according to a predefined distribution ratio. For example, the output coupler is a broadband 2×1 coupler (i.e. with two inputs and one output), a 2×2 50:50 coupler (i.e. the incoming light from both inputs is brought to interference and the resulting light guided to the two outputs in equal ratios), or a 2×3 coupler. There can be provided for more than one detector or more than one detector interface coupled to different outputs of the output coupler.

In an advantageous embodiment, the photonic integrated circuit comprises an integrated photodetector at the detector interface. The integrated photodetector can be a (integrated) photodiode. Optionally, the integrated photodetector can be an integrated dual-balanced photodetector or a plurality of photodetectors, e.g. three photodetectors. The number of photodetectors can be matched to the number of outputs of the integrated broadband output coupler. Additional photodetectors for power monitoring purposes can be positioned in the forward reference path, or alternatively in the forward sample light path, by including an additional power splitter.

In particular for OCT applications in the medical field, the total scanning rate plays a crucial role. The total scanning rate has to be high enough such that neither movements of the patient, nor movements of the examiner can blur the OCT image to be taken. This is even more the case for a potential handheld OCT unit for ophthalmologic diagnostics.

The total scanning rate of a (laterally) scanning OCT system, which also determines the achievable image resolution (e.g. in number of pixels) with a given frame rate, is limited by the sweeping rate of the SS-laser (for SS-OCT) or the variation speed of the path length of the reference arm (for TD-OCT) and the speed of a read-out electronics (for all OCT types). One way to achieve a significant increase in performance of an OCT system with respect to its total scanning rate is the multiplexing of a number of OCT channels. However, the scalability is very limited when using discrete optical components. In general, the so called full-field assembly might constitute a possibility of scanning many lateral pixels in parallel, but it suffers from a worse total image quality than OCT systems, which scan the individual lateral pixels sequentially.

These problems prevent a cost-efficient realisation of a high-performance OCT system, in particular of a high-performance SS-OCT system, and thus a broader application of OCT systems e.g. in the field of medical diagnostics, material characterization or monitoring of manufacturing processes. Currently, there are no integrated photonic multi-channel configurations in which the interference of the signal and the reference beam occurs on the photonic integrated circuit (i.e. on the chip). Thus, the advantages of a monolithic integration cannot be efficiently exploited.

It is a further objective of the present invention to provide for an OCT system with a high total scanning rate, in particular to provide for a compact, efficient and cheap parallelised OCT system with a low complexity. (Parallelised refers to the simultaneous detection of multiple OCT channels.)

For achieving this objective it is advantageous if the system comprises at least two detector interfaces (corresponding to at least two signal channels) and a corresponding number of sample light paths between the source interface and the respective detector interface as well as a corresponding number of reference light paths between the source interface and the respective detector interface, wherein the photonic integrated circuit comprises at least one integrated sample beam splitter to split the sample light paths between the source interface and the detector interfaces and at least one integrated reference beam splitter to split the reference light paths between the source interface and the detector interfaces. Advantageously, the sample light paths mutually differ from one another at least partially (i.e. they are spaced apart at least in sections) and the reference light paths mutually differ from one another at least partially (i.e. they are spaced apart at least in sections). The sample beam splitters (or reference beam splitters, respectively)

serve to split the individual sample light paths (or reference light paths, respectively) from one another. Thereby the sample beam (or reference beam respectively) is distributed to the different channels. Thus, simultaneous parallel scanning of multiple OCT channels is possible with a particularly easy and compact system. The at least one sample beam splitter and/or the at least on reference beam splitter is for example a 1×2 50:50 coupler. The above-mentioned characteristics or preferable/advantageous embodiments can be implemented for one, some or all of the detector interfaces, sample light paths, reference light paths and the further components. I.e., preferably, each of the corresponding number of sample light paths comprises a forward sample light path and a backward sample light path. Preferably, each of the forward sample light paths and the backward sample light paths is provided at least partially by the photonic integrated circuit.

In this embodiment, it is preferable if the OCT system is an SS-OCT system, avoiding the necessity to provide a spectrometer (or, more generally, a spectrally separating detector) for each channel for SD-OCT systems with a broadband light source. However, it is also possible to implement this embodiment for other types of SD-OCT systems or a TD-OCT system.

There will be at least one path crossing (in particular waveguide crossing) between at least one sample light path and at least one reference light path (in a top view of the essentially 2D-layout of the photonic integrated circuit). The at least one waveguide crossing should be a low-loss and low-crosstalk waveguide crossing. Preferably the waveguide crossings are between the forward sample light path(s) and the reference light path(s), more preferably between the forward sample light path(s) and the backward reference light path(s) (in case these exist, or the reference light path(s) between the reference and the respective detector interface, in particular the respective output coupler). This realisation allows the waveguide crossings to have a particularly low cross-talk. For example, the system may comprise (at least) 2, 4, 8 or 16 detector interfaces.

In an advantageous embodiment, the reference light paths share the same reference interface, wherein the integrated reference light beam splitters are arranged between the (common) reference interface and the detector interfaces. The reference light paths share thus a common light path between the source interface and the reference interface and are only split into separate light paths after returning from the reference interface (i.e. in the backward reference light path, in case it exists). Thus, a particularly compact system can be achieved.

Alternatively, it is preferable if the reference light paths share the same reference-side polarization rotating element, wherein the integrated reference beam splitters are arranged between the reference-side polarization rotating element and the detector interface. This is a particularly compact implementation of the embodiment with an integrated reference-side polarization rotating element, thus also comprising the advantages described above in that context. Since the reference-side polarization rotating element is arranged optically before the reference beam splitters, only one (common) reference-side polarization rotating element is enough for bringing the reference beams of all reference light paths into an appropriate condition for interference with the sample beams.

It is advantageous if the at least one integrated sample beam splitter and the at least one integrated reference beam splitter are configured for orthogonal polarization modes. The advantage of (naturally different) orthogonal polarization modes is that the crosstalk is in the orthogonal polarisation. Preferably, the at least one integrated sample beam splitter is arranged in the forward sample light path and the at least one integrated reference beam splitter is arranged in the backward reference light path. The light propagating along the forward sample light path and forward reference light path could be in the transverse-electric like waveguide mode and light propagating in the backward sample light path and the backward reference light path could be in the transverse-magnetic like waveguide mode, or vice-versa (the according waveguide sections can be optimized for transmission of the respective mode); wherein the polarization states of the light propagating in the section of the respective light paths in which the respective forward and backward light paths overlap might be orthogonal to each other. In this case a particularly low impact of cross-talk can be achieved if the waveguide crossings are between the forward sample light path(s) and the reference light path(s), more preferably between the forward sample light path(s) and the backward reference light path(s) (in case these exist), where the polarisation of the light concerned is orthogonal. In a preferred embodiment, the sample-side polarization beam splitters are implemented in a double stage configuration to improve the suppression of an unwanted polarization component. Of course, it is also within the scope of the present disclosure that the forward sample light path and the reference light path can have the same polarization. The level of crosstalk in this configuration is usually still acceptable.

It is preferable if at least two of the integrated sample-side polarization beam splitters arranged in the sample light paths are provided in a mirrored arrangement. More specifically, the input of the respective forward sample light paths from the source interface and the output of the respective backward sample light paths to the detector interface are mirrored with respect to the output of the respective forward sample light paths to the sample interface (and equivalently the input of the respective backward sample light paths from the sample interface) for at least two sample light paths (wherein input and output refers to the respective sample-side polarization beam splitters in mirrored arrangement). This mirrored arrangement allows reducing the number of waveguide crossings for some embodiments (see below) and allows for more compactness due to routing constraints (waveguide bending radii etc.). Preferably, there is a reflectional symmetry of at least two of the integrated sample-side polarization beam splitters (which are in mirrored arrangement) e.g. with respect to a plane normal to a substrate of the photonic integrated circuit. In particular, mirrored arrangement refers to two of the integrated sample-side polarization beam splitters being arranged such that either the outputs of each of the sample-side polarization beam splitters, from which outputs the respective backward sample light path leads to the detector interface, could be connected with each other by a path without crossing any forward sample light path, or the inputs of each of the sample-side polarization beam splitters, to which inputs the respective forward sample light path is lead from the source interface, could be connected with each other by a path without crossing any backward sample light path. It is preferable if the system comprises at least three detector interfaces and a corresponding number of sample light paths between the source interface and the respective detector interface. It is advantageous if the photonics integrated circuit comprises at least two integrated sample beam splitters to split the sample light paths between the source interface and the detector interfaces and at least two integrated reference beam splitters to split the reference light paths between the source interface and the detector interfaces. It is advantageous if two immediately adjacent integrated sample-side polarization beam splitters are in mirrored arrangement with one another, in particular such that the outputs of their respective backward sample light paths leading to a detector interface could be connected without the necessity for a waveguide crossing. (Under immediately adjacent is understood that within the area delimited by the chip-air boundary and the two respective sample light paths between the point at which they are separated from one another by a sample beam splitter and chip-air boundary there is no other sample light path. In other words, the points at which the two respective sample light paths intersect with the chip-air boundary are not separated by an intersection of a third sample light path with the chip-air boundary.) The sample beam splitters should have splitting ratios such that the intensities at the outputs correspond to the number of sample interfaces in the light paths from each respective output. E.g., if there are four sample light paths, wherein always one sample light path is split from all remaining sample light paths by a sample beam splitter, the splitting ratios of the sample beam splitters should be 3:1 (or 75:25, respectively), 2:1 and 1:1. In case of $n^2$ sample interfaces, a cascade of 1×2 splitters (each having a 1:1 splitting ratio) is preferred. Generally, it is also possible to use splitters with more than two outputs, e.g. a single 1:n splitter to provide for n channels.

It is advantageous if the system further comprises a microlens array providing a microlens for each sample light path, wherein the microlens array is arranged in the forward sample light paths and the backward sample light paths between the integrated sample side polarization beam splitter and the sample interface. The microlens array can be arranged in the forward sample light paths and backward sample light paths on either side of a sample-side polarization changing element (e.g. a quarter wave plate or a Faraday rotator), i.e. between the sample interface and the sample-side polarization changing element or on a side of the sample-side polarization changing element opposite the sample interface. The microlens array can collimate or re-shape the divergence of the sample light beams, in particular to match it with requirements of the subsequent imaging and scanning optics, thus improving the image quality.

BRIEF DESCRIPTION OF THE DRAWINGS

By way of example, the invention is further explained with respect to preferred embodiments shown in the drawings. However, these preferred embodiments shall not be considered limiting for the invention. The figures show:

FIG. 3*a* schematically an exemplary embodiment of the system with an external detector and an integrated reference;

DETAILED DESCRIPTION

Figure 1:
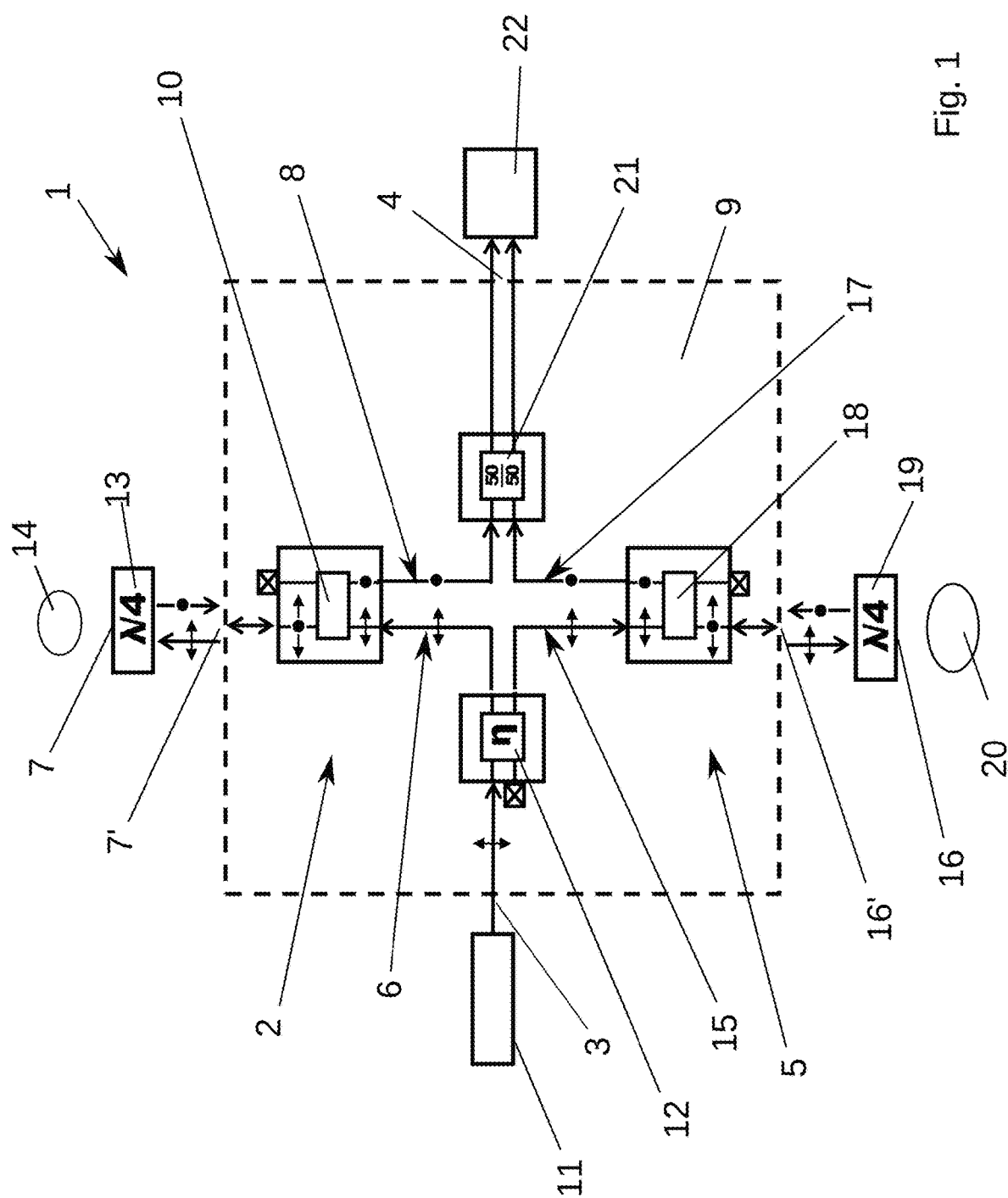
FIG. 1 schematically an exemplary embodiment of the system with an external detector and a reference-side polarization beam splitter.

FIG. 1 shows an exemplary embodiment of the optical coherence tomography system 1, which may be an SS-OCT system. The system 1 comprises a sample light path 2 between a source interface 3 and a detector interface 4 and a reference light path 5 between the source interface 3 and the detector interface 4. The sample light path 2 comprises a forward sample light path 6 between the source interface 3 and a sample interface 7. Alternatively, the sample interface can also be considered to be at 7' (for an OCT system 1 not comprising the sample-side polarization changing element 13 or comprising an integrated sample-side polarization changing element 13). The sample light path 2 further comprises a backward sample light path 8 between the sample interface 7 and the detector interface 4. The system further comprises a photonic integrated circuit 9, which is schematically delimited by the dashed lines. The forward sample light path 6 and the backward sample light path 8 are partially provided by the photonic integrated circuit 9 (or, if 7' is considered the sample interface, the forward sample light path 6 and the backward sample light path 8 are completely provided by the photonic integrated circuit 9). The source interface 3 and the detector interface 4 are in this embodiment both external interfaces; more specifically they are coupling a light beam from free space into and out of the photonic integrated circuit 9. The photonic integrated circuit 9 further comprises an integrated sample-side polarization beam splitter 10 arranged in the forward sample light path 6 and the backward sample light path 8.

FIG. 1 further shows a source 11, in particular a sweeping laser source (i.e. capable of sweeping a range of wavelengths), which may be part of the system 1 or not. The source 11 emits a light beam. An exemplary possibility of the polarization of light beams is indicated by arrows and by dots on the respective light paths. The shown polarizations disregard potential unwanted reflections at the chip-air boundary, at the respective polarization beam splitters and other components, potential imperfect suppressions by the polarization beam splitters and similar unwanted effects. These indicate polarizations orthogonal to one another; in particular the dots indicate polarizations orthogonal to the sheet/image plane. It is noted that the square surrounding the respective devices is a symbolic representation of the whole device, which is depicted consistently through all Figures. In other word, the part within the square is a graphical denotation of the specification of the respective device, and does not mean, that in the respective location or situation all aspects of this specification would be employed. I.e. the polarizations shown refer to the general function of the respective device and do not necessarily represent the actual (desired) polarizations occurring in the respective paths. The box labelled "$\lambda/4$" is a graphical denotation of the specification of a general polarization changing element for rotating the polarization of linearly polarized light by 90° after a forward and a backward pass and does not necessarily imply a quarter wave plate. In this exemplary possibility, the polarizations are transverse electromagnetic, wherein the arrows may represent transverse electric and the dots transverse magnetic, or vice-versa. The source 11 may emit light that is already polarized. At first, the light beam is commonly guided along the sample light path 2 and the reference light path 5. An integrated input beam splitter 12 is arranged in the sample light path 2, in particular in the forward sample light path 6, and in the reference light path 5 and splits the respective light paths up and thus the light beam into a sample light beam traveling along the sample light path and a reference light beam traveling along the reference light path. There is further provided for a terminator (indicated by an x in a square symbol), terminating light that is reflected from the input beam splitter 12. It is noted that the input beam splitter 12 does not need to be part of the system 1. It would, for instance, also be possible to couple two separate beams into the sample light path 6 and the reference light path 15, which may be distinct and spaced-apart from the sample light path 6 at this point.

The sample light beam is subsequently guided along the sample light path 2 (and equivalently the forward sample light path 6) to the sample-side polarization beam splitter 10. The sample light beam passes the sample-side polarization beam splitter 10 (by which it could also be polarized/filtered) and continues along the forward sample light path 6, which here is equivalent to the backward sample light path 8, where it also gets emitted from the photonic integrated circuit 9 (from the sample interface if it is defined to be at 7'). Subsequently, it is guided through a sample-side polarization changing element 13 for rotating the polarization axis of linearly polarized light by 90° after a forward and a backward pass. The sample-side polarization changing element 13 may be part of the system 1 or not; for example, it could be provided in an external device, into which the system 1 is inserted. If it is part of the system 1, the sample-side polarization changing element 13 is arranged in the forward sample light path 6 and the backward sample light path 8 between the integrated sample-side polarization beam splitter 10 and the sample interface 7. The sample-side polarization changing element 13 can for example be a broadband quarter wave plate as indicated in FIG. 1. After passing through the sample-side polarization changing element 13 for the first time, the light beam is directed at a sample 14.

The light beam reflected from the sample 14 is then subjected to the sample-side polarization changing element 13 for the second time. After this forward and backward pass, the polarization of the light beam is rotated by 90° compared to the light beam before subjected to the sample-side polarization changing element for the first time. Thus, the backward sample light beam now has a polarization orthogonal to the polarization of the forward sample light beam. Subsequently it is again directed to the sample-side polarization beam splitter 10. Between the sample-side polarization beam splitter 10 and the sample interface 7, the forward sample light path 6 and the backward sample light path 8 are overlapping. Indeed, the forward sample light path 6 and the backward sample light path 8 are also overlapping outside the photonic integrated circuit, i.e. on both sides of the sample-side polarization changing element 13. They are indicated as spaced-apart arrows in FIG. 1 up to the sample-side polarization changing element 13 only to visualize the different polarizations of the sample light beam on the forward sample light path 6 and the backward sample light path 8 respectively. However, since the polarization of the backward sample beam now is orthogonal to the polarization of the forward sample beam, it can be split by the sample-side polarization beam splitter 10, thus being directed to a different output than the one through which the forward sample beam had been put in. Therefore, the backward sample light path 8 is separated from the forward sample light path 6 on the sample-side polarization beam splitter's far side with respect to the sample interface 7. There is also provided for a terminator, terminating light incident on this port, e.g. crosstalk of the forward sample light, to prevent back reflection of this light. Concerning the polarizations, the light beam's polarization in the forward sample light path is a first polarization up until the sample-side polarization beam splitter. After the first pass through the sample-side polarization beam splitter 10, in the path common to the forward sample light path 6 and the backward sample light path 8, both the first polarization and a second polarization orthogonal to the first polarization are prevalent. After the second pass through the sample-side polarization beam splitter 10, there is (substantially) only the second polarization prevalent in the backward sample light path 8.

While the sample light path 6 continues along a first output of the input beam splitter 12, the reference light path 5 continues along a second output of the input beam splitter 12. In this embodiment, the mode of operation of the reference light beam and the reference light path 5 is similar to the mode of operation of the sample light beam and the sample light path 2, replacing the sample components with respective reference components and the sample 14 with reference 20. As such, the reference light path 5 comprises a forward reference light path 15 between the source interface 3 and a reference interface 16 (or alternative the reference interface 16' for a system not comprising the reference-side polarization changing element 19 or comprising an integrated reference-side polarization changing element 19) and a backward reference light path 17 between the reference interface 16 and the detector interface 4. The forward reference light path 15 and the backward reference light path 17 are partially provided on the photonic integrated circuit 9 (or completely, if the reference interface is defined to be at 16'). In this embodiment, the reference interface 16, 16' is an external interface; more specifically the reference interface 16, 16' is coupling the reference light beam out of and into the system 1 or the photonic integrated circuit (into/from free space) more specifically. The photonic integrated circuit 9 comprises an integrated reference-side polarization beam splitter 18 arranged in the forward reference light path 15 and the backward reference light path 17. (There is again provided for a terminator.) There is further provided for a reference-side polarization changing element 19 for rotating the polarization of linearly polarized light by 90° after a forward and backward pass, wherein the reference-side polarization changing element 19 is arranged in the forward reference light path 15 and the backward reference light beam 17 between the integrated reference-side polarization beam splitter 18 and the reference interface 16. The reference-side polarization changing element 19 does of course not need to be part of the system 1 (compare reference interface 16'), nor does the reference-side polarization beam splitter 18.

The backward sample light path 8 and the backward reference light path 17 are combined by the integrated broadband output coupler 21 arranged in the backward sample light path 8 and in the reference light path 5, more specifically the backward reference light path 17, wherein each of the light paths leads to one of the inputs of the output coupler 21, and the backward sample beam and backward reference beam are brought to interference. The output coupler 21 can for example be a 2×1 or a 2×2 coupler. The combined backward sample light path 8 and backward reference light path 17 (or paths, in case the output coupler 21 has more than one output) subsequently direct the light beam to the detector interface 4. Then, the interference(s) of the sample beam and reference beam is (are) detected in a detector 22, in particular a balanced photodetector. The backward sample light path 8 and the backward reference light path 17 are evidently overlapping after the output coupler 21 and, in case of multiple outputs, in each of the light paths between an output and an associated detector input.

In this exemplary embodiment, the input beam splitter 12, the sample-side polarization beam splitter 10 and reference-side polarization beam splitter 18, the output coupler 21 and most of the sample light path 2 and the reference light path 5 are integrated on the photonic integrated circuit 9, thus leading to an improved compactness and better stability. Furthermore, the system 1 is much more compact and easier and cheaper to produce than if any of these components were provided as a discrete (i.e. non-integrated) optical component.

Figure 2:
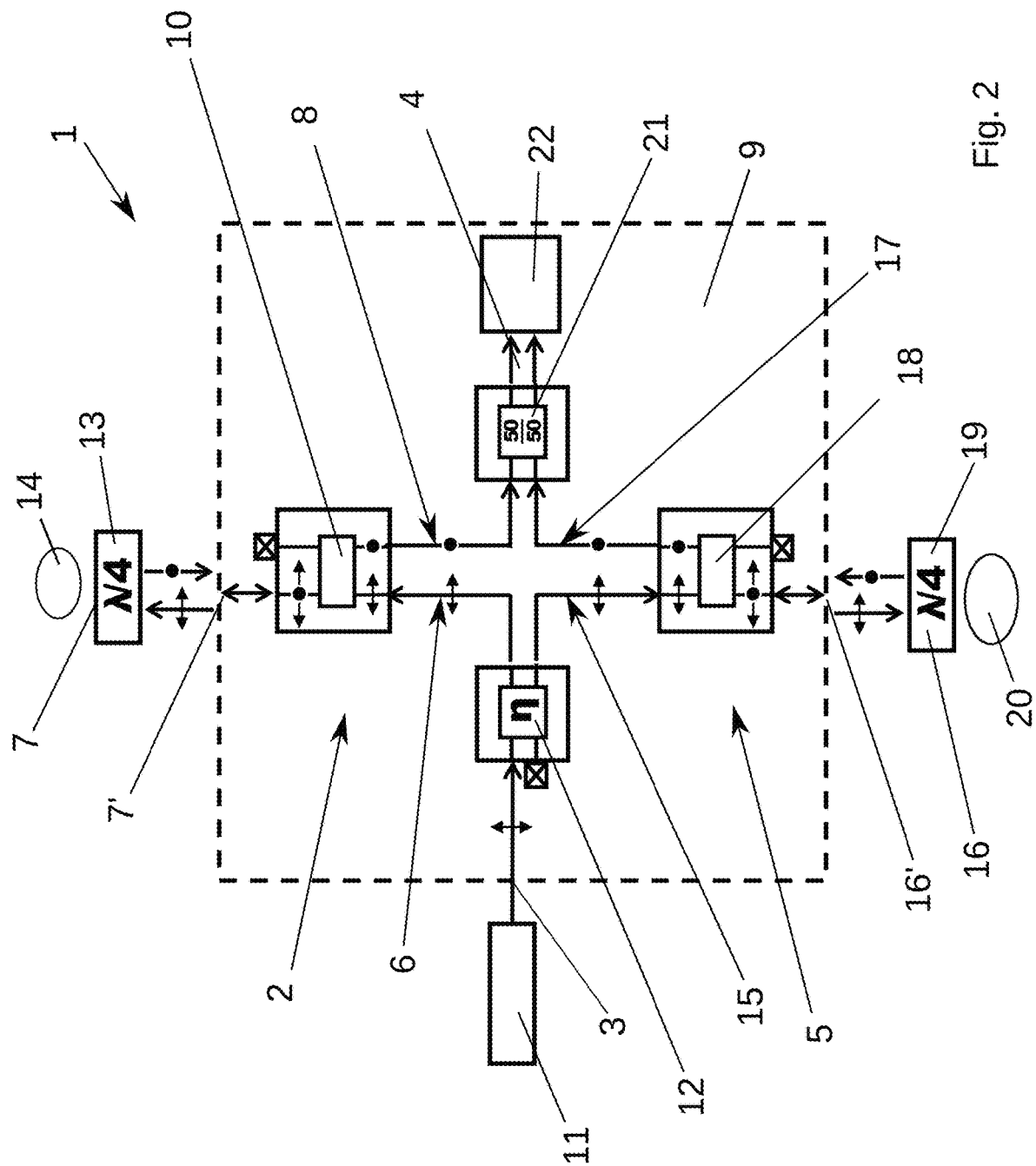
FIG. 2 schematically an exemplary embodiment of the system with an integrated detector and a reference-side polarization beam splitter.

The exemplary embodiment of the system 1 shown in FIG. 2 differs from the one in FIG. 1 in that the detector interface 4 is integrated, as well as the detector 22, on the photonic integrated circuit 9. The integration of the detector 22 ensures reliable optical coupling at the detector interface 4 between the waveguides defining the light paths of the photonic integrated circuit 9 and the detector inputs. The integration of the detector can be done homogenously, where the optical waveguides are fabricated directly on the same integrated chip containing the detector, or the detector is fabricated directly on the same integrated chip containing the optical waveguides. Alternatively, the integration of the detector can be done heterogeneously where the optical waveguides component and the detector component are fabricated separately and packaged together e.g. via flip chip mounting. The homogeneous integration is preferred due to reduced packaging costs and increased stability.

Figure 3:
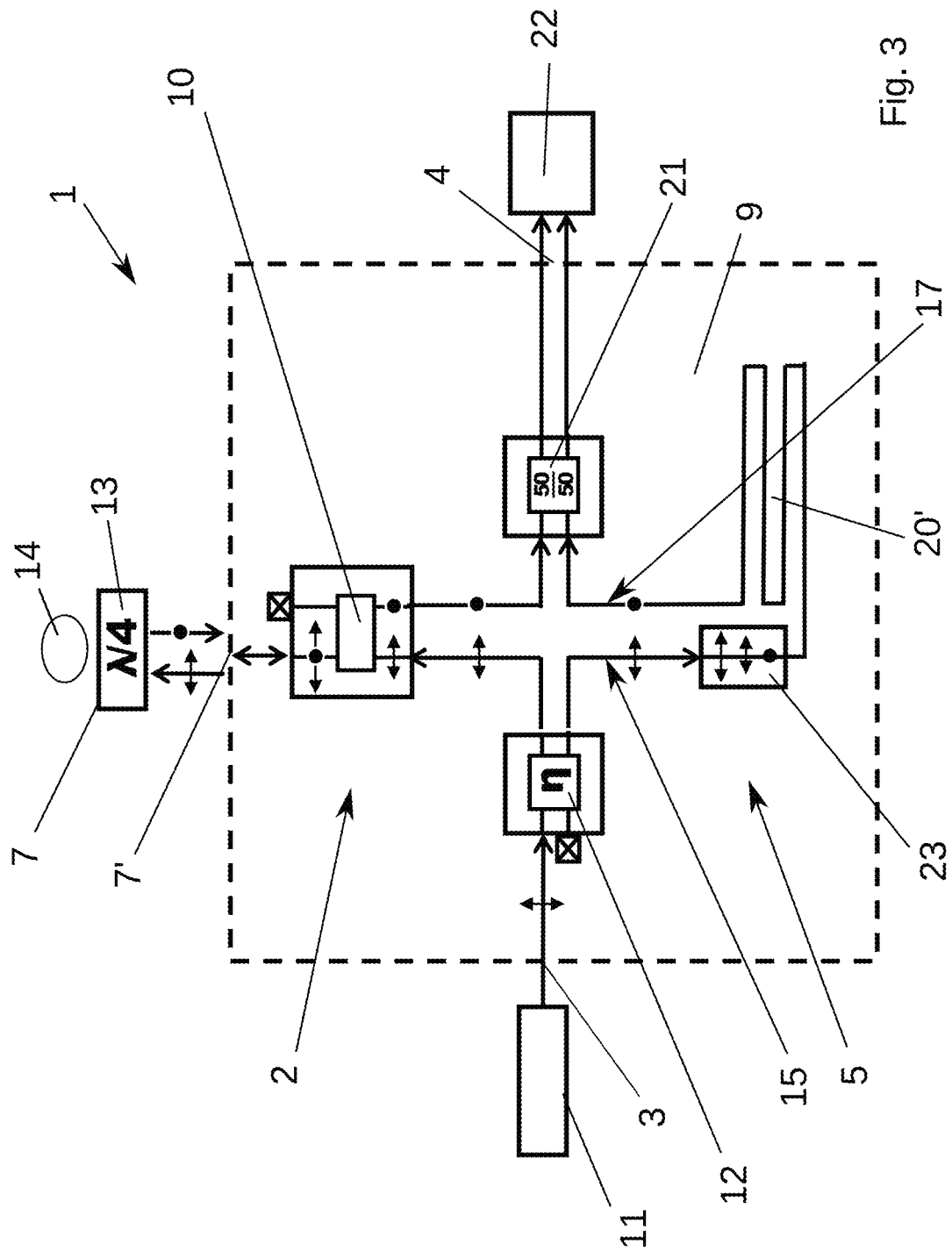
FIG. 3 schematically an exemplary embodiment of the system with an external detector and an integrated reference.
Figure 4:
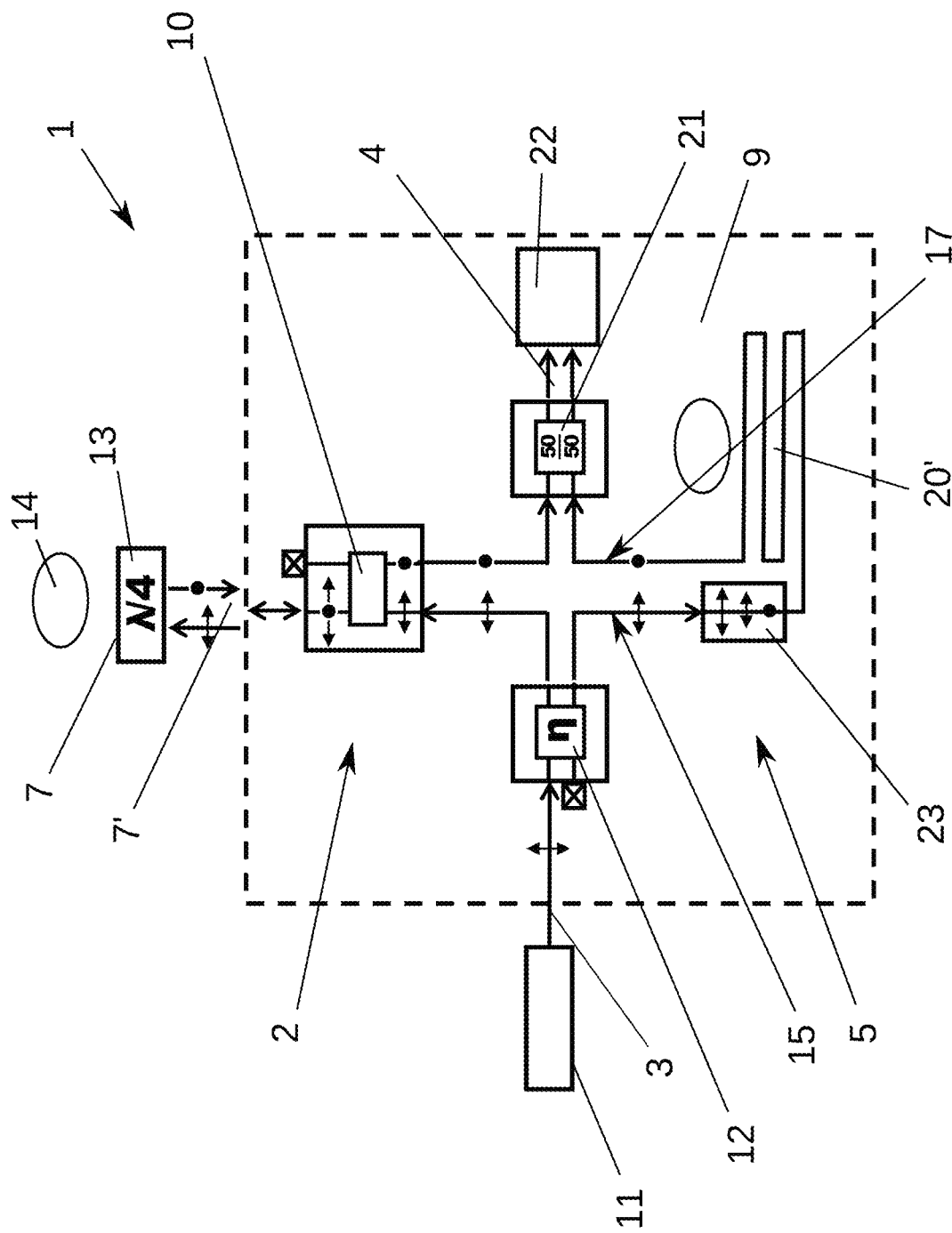
FIG. 4 schematically an exemplary embodiment of the system with an integrated detector and an integrated reference.

The exemplary embodiment shown in FIG. 3 differs from the one in FIG. 1 in that the reference-side polarization beam splitter 18, the reference-side polarization changing element 19 and the external reference 20 are omitted and replaced by the following components. The reference light path 5 is (fully) integrated on the photonic integrated circuit 9 between the source interface 3 and the detector interface 4 and it is a one-way light path in the sense that the reference light beam travels in only one direction, such that there are no designated forward and backward reference light paths. The photonic integrated circuit 9 comprises a reference-side polarization rotating element 23 for rotating one polarization eigenmode by 90° into the orthogonal polarization eigenmode (cf. indicated polarization axis change in element 23) in the reference light path 5, bringing the reference light beam into an appropriate polarization state for interference with the sample light beam and, thus, for detection. This is required, since the sample light path in use comprises the sample-side polarization changing element 13 (which, however, does not need to be a part of system 1). Furthermore, the reference light path 5 comprises an integrated reference 20'. The integrated reference 20' is configured to provide a similar propagation length for the reference light beam and the sample light beam to achieve a path length difference smaller than the coherence length of the source beam. Thus, the system 1 can be integrated on the photonic integrated circuit 9 to an even higher degree.

The exemplary embodiment shown in FIG. 3a differs from the one in FIG. 3 in that the photonic integrated circuit 9 comprises a sample-side polarization rotating element 23a for rotating one polarization eigenmode by 90° into the orthogonal polarization eigenmode (cf. indicated polarization axis change in element 23a) in the sample light path 2, instead of the reference-side polarization rotating element 23.

Figure 5:
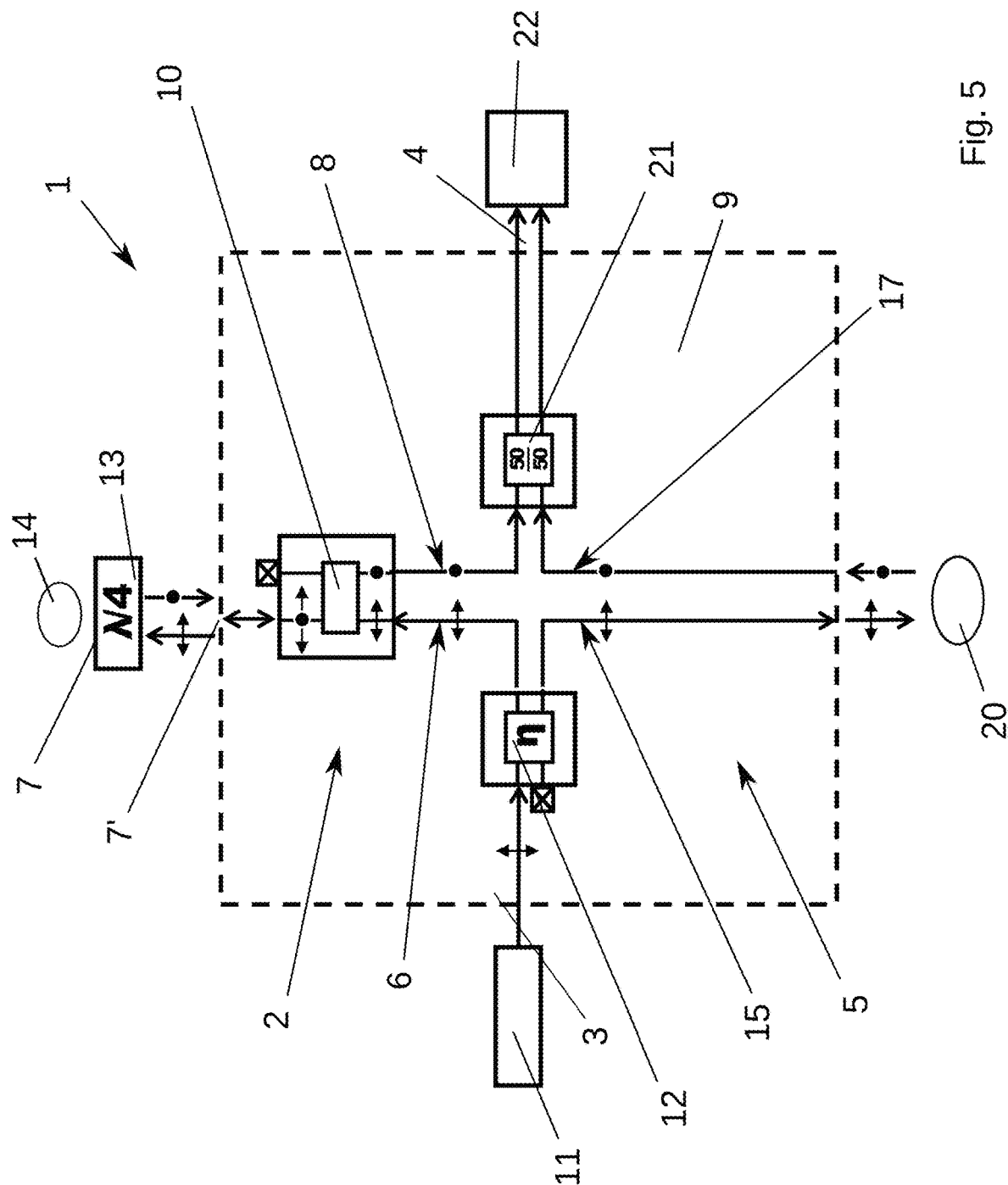
FIG. 5 schematically another exemplary embodiment of the system with an external detector.

FIG. 5 shows an advantageous embodiment of system 1, which differs from the one shown in FIG. 1 in that it does not comprise the reference-side polarization beam splitter 18 and the reference-side polarization changing element 19. The polarization axis of the reference light beam in the reference light path 5 is changed externally of system 1. This allows additional flexibility.

Figure 6:
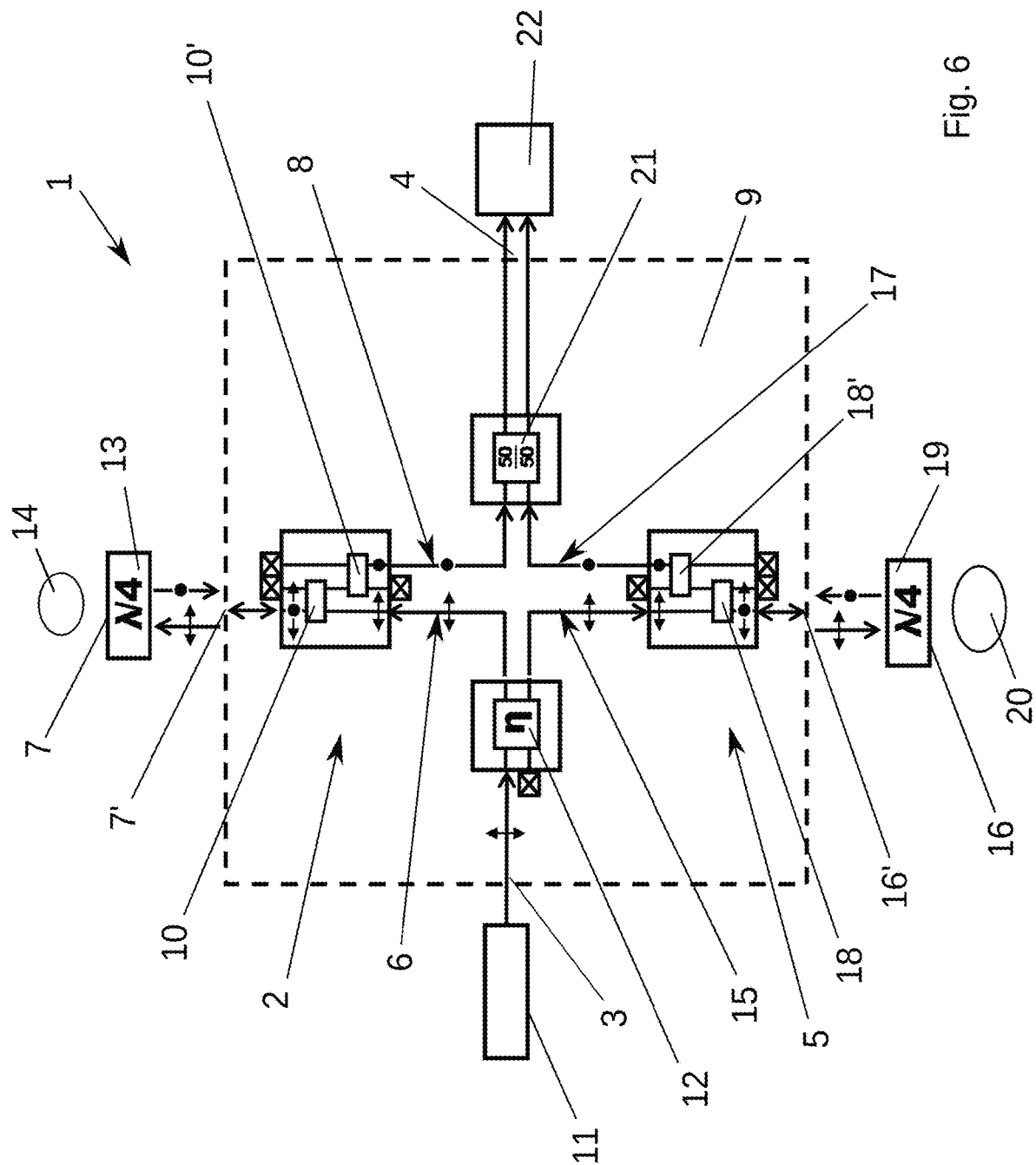
FIG. 6 schematically another exemplary embodiment of the system with an external detector and two polarization beam splitters in a double-stage arrangement.

Some of the light coming from the sample-side polarization beam splitter 10 to the respective chip-air boundary in the forward sample light path 6 and from the reference-side polarization beam splitter 18 to the respective chip-air boundary in the forward reference light path 15 would usually be directly reflected into the backward sample light path 8 and, respectively, backward reference light path 17 in the direction of the detector interface 4 without having passed through the respective polarization changing element 13, 19. Some of this reflected light would pass the respective polarization beam splitter 10, 18 due to imperfections of the polarization beam splitters. These reflections would have similar path lengths at the reference side and the sample side and would therefore interfere. To stop this undesired light, the preferable embodiment of system 1 shown in FIG. 6 comprises an additional sample-side polarization beam splitter 10' in the backward sample light path 8 and an additional reference-side polarization beam splitter 18' in the backward reference light path 17, compared to the embodiment shown in FIG. 1. These additional polarization beam splitters 10', 18' arranged in a double-stage configuration can further suppress the light that did not pass through the respective polarization changing element 13, 19, e.g. reflected from the chip-air boundary. The undesired light components are terminated in an additional terminator. Thus, by providing the additional sample-side polarization beam splitter 10' and/or the additional reference-side polarization beam splitter 18' the image quality can be improved.

Figure 7:
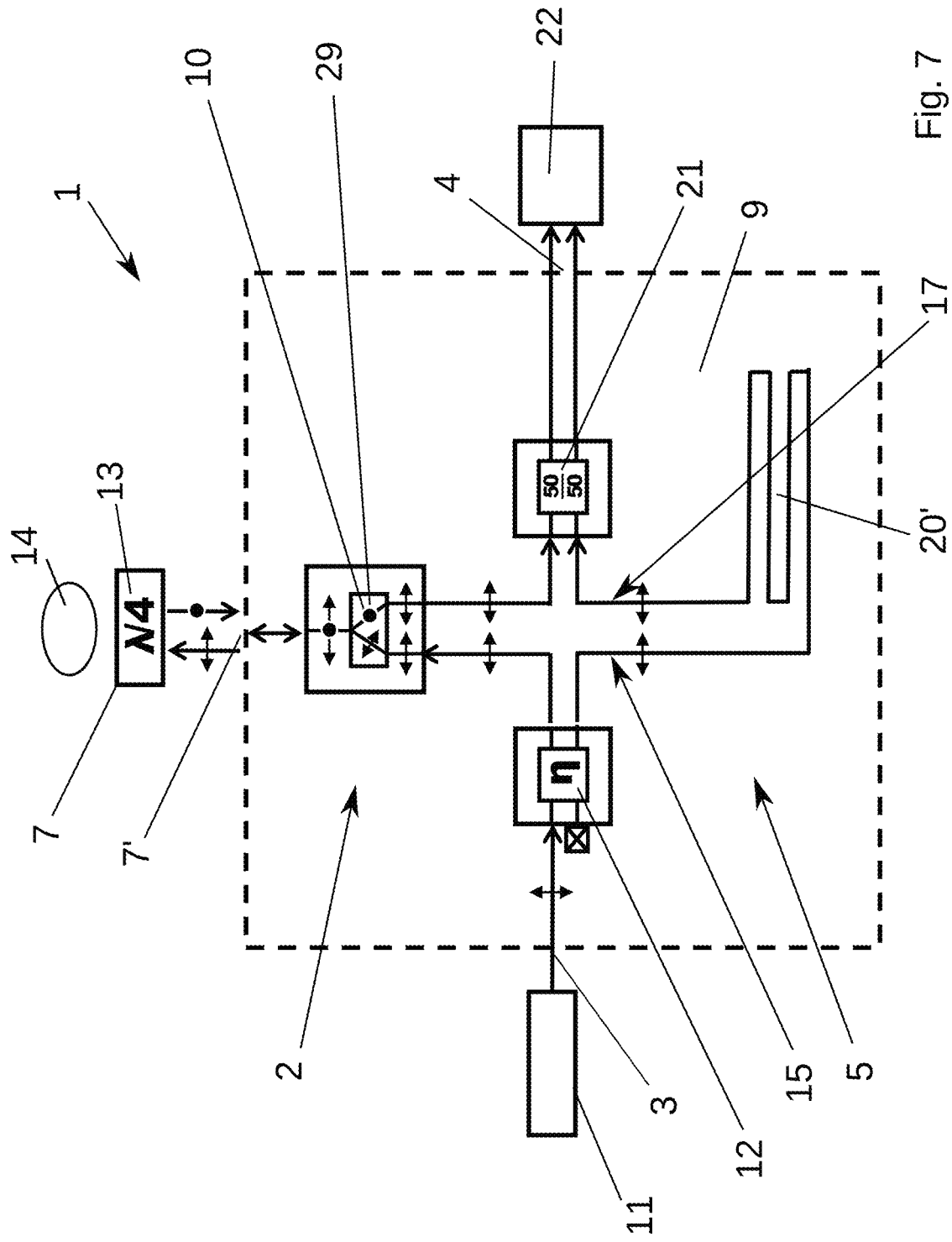
FIG. 7 schematically another exemplary embodiment of the system with an external detector and an integrated reference, wherein the sample-side polarization beam splitter is a polarization splitter rotator.

FIG. 7 shows another advantageous embodiment of system 1. This embodiment is similar to the one shown in FIG. 3, however, the reference-side polarization rotating element 23 is left out and there the sample-side polarization beam splitter 10 is a polarization splitter rotator 29. The polarization splitter rotator performs simultaneous/combined polarization splitting and polarization rotation. Functionally, providing for the sample-side polarization beam splitter 10 as a polarization splitter rotator 29 yields the same result as providing a sample-side polarization beam splitter (without the rotating function) and a sample-side polarization rotating element (not shown). The end polarization and output port are specific to the polarization of the light entering the single input port. TE-like polarized light is always exiting one port and stays as TE-like and TM-like polarized light is exiting the other port and changes its polarization to TE-like in this process. Accordingly, in the other direction, viewing the two ports as input ports and the single port as output port, TE-like polarized light entering on one input port is exiting the single output port as TE-like, while TE-like polarized light entering the other input port is exiting the single output port as TM-like. The same is possible with TE-like and TM-like exchanged. (The representation in the Figures is simplified; the rotation and the separation of polarizations actually happen simultaneously as mentioned above.) Consequently, the polarization eigenmode of the light beam passing the sample-side polarization beam splitter 10 in the direction to the detector interface 4 is rotated by 90° to the orthogonal polarization eigenmode and brought into a state for interference with the (unrotated) reference beam. This embodiment is particularly easy to implement on the photonic integrated circuit 9.

Figure 8:
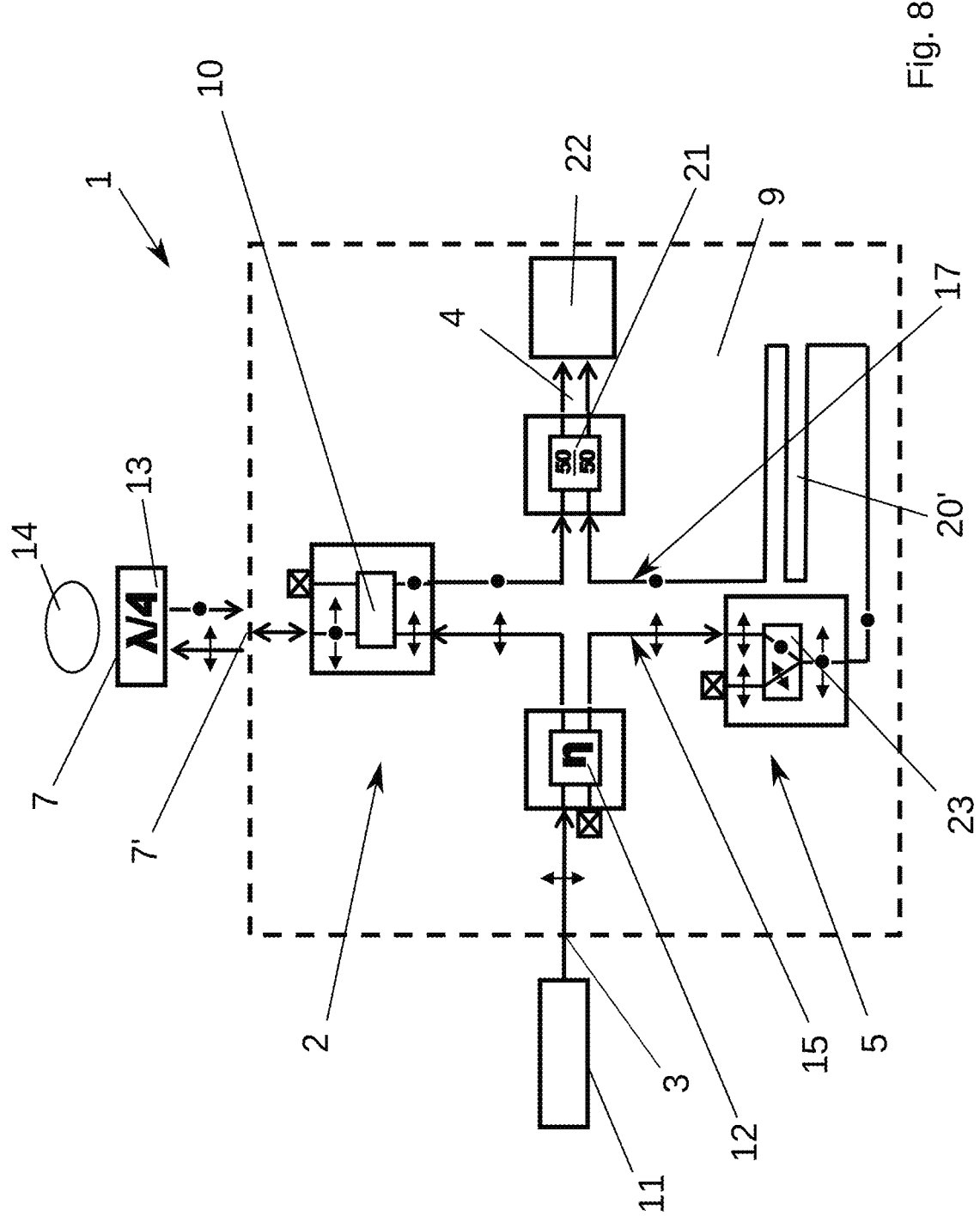
FIG. 8 schematically an exemplary embodiment of the system with an integrated detector, an integrated reference, an external sample-side polarization changing element and a combined reference-side polarization splitter rotator used as a reference-side polarization changing element.

FIG. 8 shows another advantageous embodiment similar to the one shown in FIG. 3. In this embodiment, the reference-side polarization rotating element 23 is implemented by a polarization splitter rotator. As already noted above, the square is only a symbolic representation of the whole device. Therefore, the TE-like polarization is also depicted at the port facing to the backward reference light path 17 since this is considered the input port of the polarization rotating element 23, however, since TE-like polarized light is applied to the output port for the TM-like mode, only the TM-like polarization mode is present after the polarization splitter rotator element. The TE-like polarization mode would only be there if light in the TE-like polarization mode would be applied at the terminated port facing to the forward reference path 15. Since here only the rotating function of the polarization splitter rotator is relevant, it is considered the polarization rotating element 23. Furthermore, the detector 22 is integrated.

Figure 9:
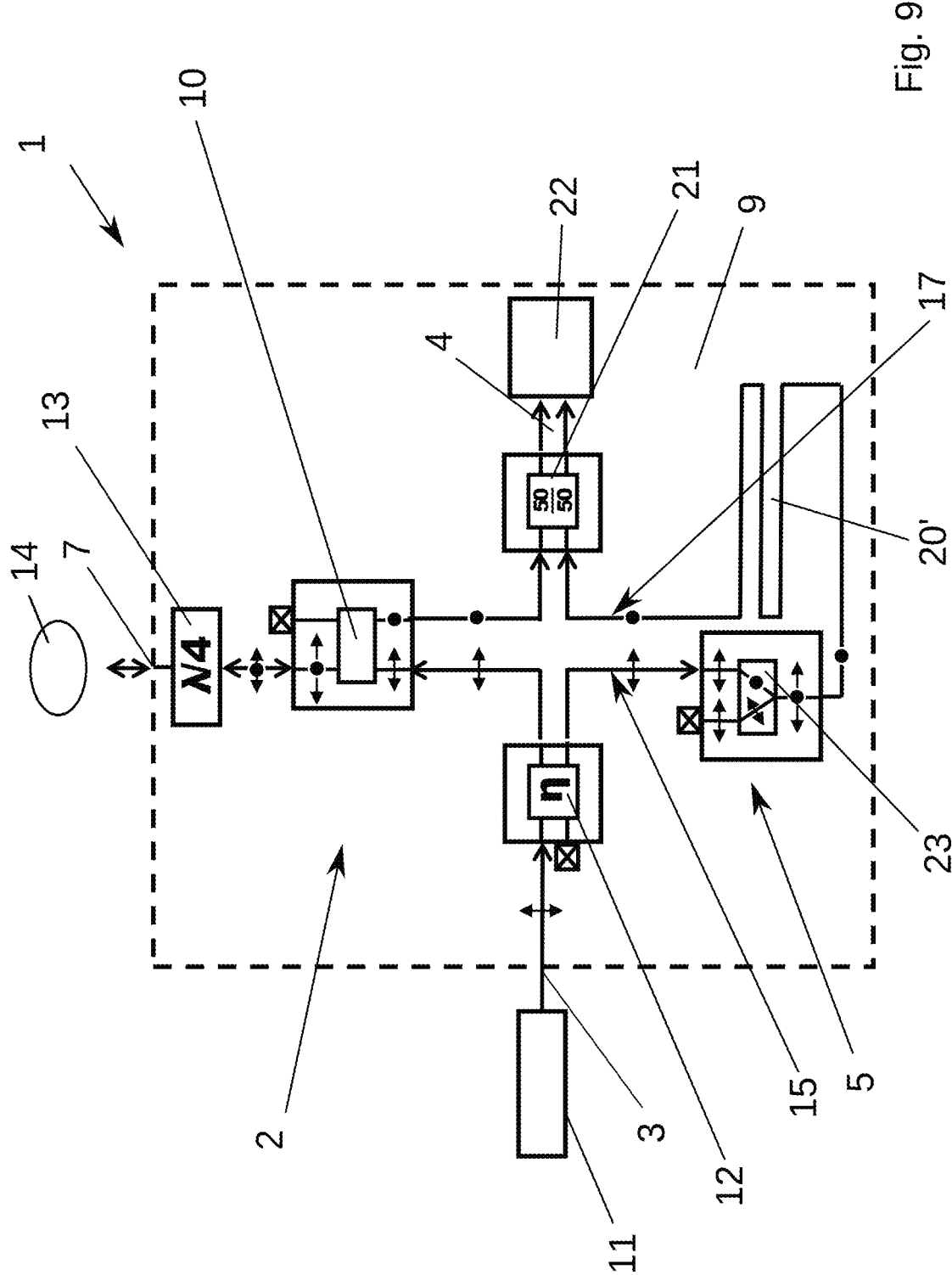
FIG. 9 schematically an exemplary embodiment of the system similar to FIG. 8, but with an integrated detector and an integrated sample-side polarization changing element.

FIG. 9 shows another exemplary embodiment similar to the one shown in FIG. 8, with the difference that the sample-side polarization changing element 13 is integrated on the photonic integrated circuit 9, thus allowing an even more compact design. In this embodiment, the waveguide of the sample light path 2 on the side of the sample-side polarization changing element 13 leading to the sample interface 7 has a square cross-section (so as to not perturb the circular or 45° polarization state).

Figure 10:
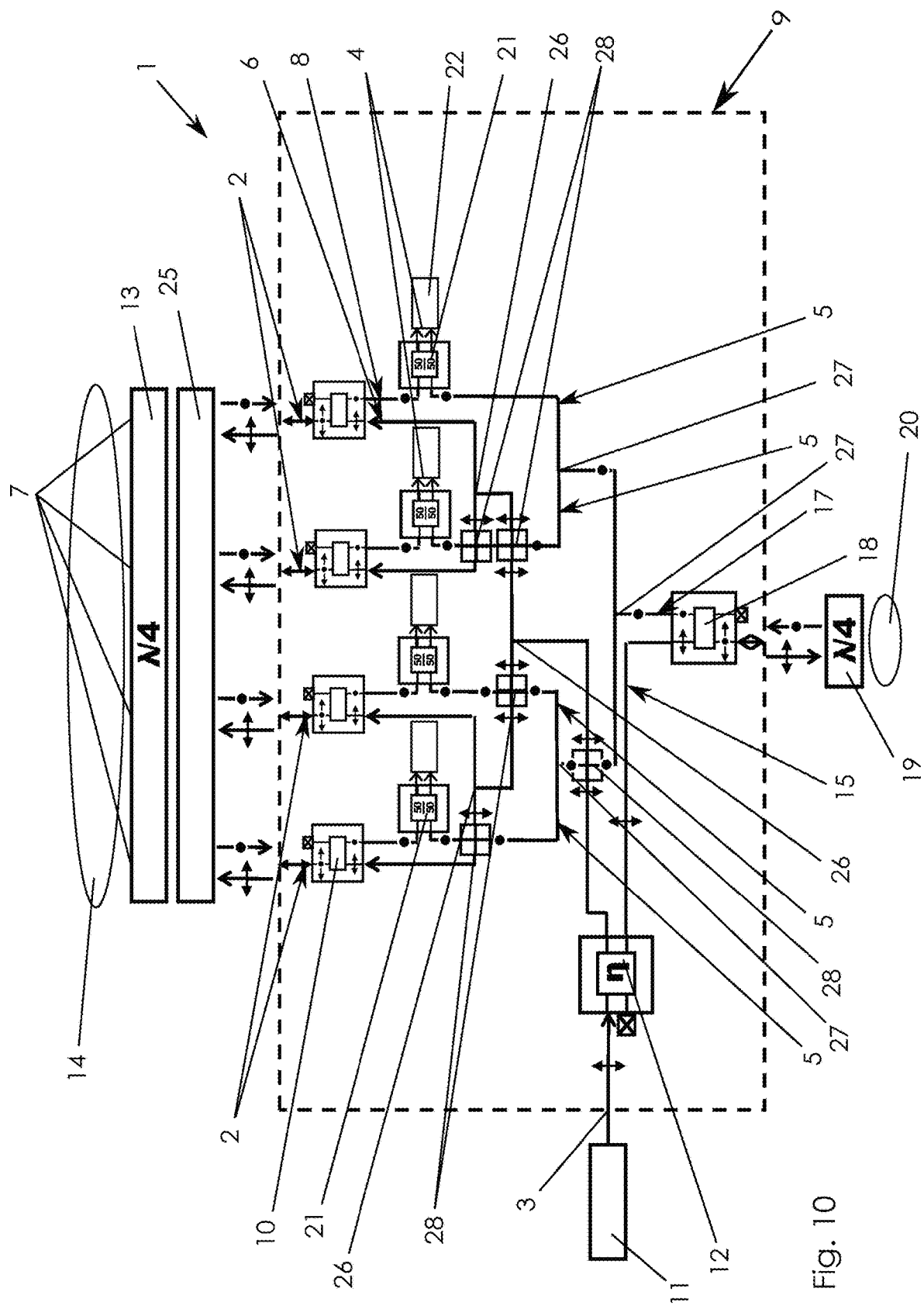
FIG. 10 schematically an exemplary embodiment of the system with four sample interfaces.

FIG. 10 shows an advantageous embodiment of system 1 with four sample interfaces 7 and four sample light paths 2 between the source interface 3 and the respective one of the four detector interfaces 4, thus providing for a multi-channel OCT system. There are also four reference light paths 5 between the source interface 3 and the respective ones of the four detector interfaces 4. The photonic integrated circuit 9 comprises three integrated sample beam splitters 26 between the source interface 3, in particular the input beam splitter 12, and the respective sample interfaces 7 or the respective sample-side polarization beam splitters 10. The sample beam splitters 26 are 1×2 50:50 beam splitters in this embodiment. They first split the original sample light path into two light paths and subsequently each of these two light paths is split again, thus resulting in the four sample light paths 2. Similarly, an original reference light path is split into the four reference light paths 5 between the reference-side polarization beam splitter 18 and the respective detector interfaces 4 or the respective output couplers 21, by three integrated reference beam splitters 27. The three reference beam splitters 27 are 1×2 50:50 beam splitters.

Each individual sample light path 2 and reference light path 5 functions essentially the same as described in the context of FIG. 1. It is noted that the sample light paths 2 are already split in the forward sample light paths 6, in particular before (or "upstream" of) the sample-side polarization beam splitters 10, since each sample location 14 has to be scanned individually; while the reference light paths 5 are only split in the backward reference light paths 17, since all reference beams can be brought into interference with one and the same reference 20. Therefore, the reference-side polarization changing element 19 and the reference-side polarization beam splitter 18 are in one common light path section of the four reference light paths 5, i.e. the reference light paths share the same reference-side polarization changing element 19 and reference-side polarization beam splitter 18; while there is provided for a separate sample-side polarization beam splitter 10 for each of the sample light paths 2 and the sample-side polarization changing element 13 covers the four separate sample light paths 2. Of course, there can also be provided for a separate sample-side polarization changing element 13 for each of or for some of the sample light paths 2, i.e. there can for example be provided for four sample-side polarization changing elements 13. Also, the reference light paths 5 could already be split in the forward reference light paths 15 and each reference beam could be interacted with a separate reference 20.

In this embodiment, there are five waveguide crossings 28 between the sample light paths 2 and the reference light paths 5. In particular, the crossings 28 are between the forward sample light paths 6 (between the input beam splitter 12 and the sample-side polarization beam splitters 10) and the backward reference light paths 17 (between the reference-side polarization beam splitter 18 and output couplers 21). As can be seen from the polarizations indicated in the respective light paths, the three integrated sample beam splitters 26 and the three integrated reference beams splitters 27 are configured for (different) orthogonal polarization modes. Thus, the light beams in the forward sample light paths 6 and in the backward reference light paths 8 can have orthogonal polarization with respect to one another. Hence, the crosstalk at the waveguide crossings 28 can be significantly reduced.

In this embodiment, the sample-side polarization beam splitters 10 are all aligned in the same way, i.e. their outputs of the respective backward sample light path 8 leading to the detector interface 4 are all on the same side with respect to the input and output of the forward sample light path 6.

Furthermore, the system 1 comprises a microlens array 25 providing for a microlens for each sample light path 2. The microlens array 25 is arranged in the forward sample light path 6 and the backward sample light path 8 between the respective integrated sample-side polarization beam splitter 10 and the respective sample interface 7, in particular the respective sample-side polarization changing element 13. It could of course also be placed on the other side of the respective sample-side polarization changing element 13. The micro lenses of the microlens array 25 collimate or re-shape the divergence of the outgoing beam to match it with the requirements of the subsequent imaging and scanning optics located between the microlens array 25 and the sample 14.

Figure 11:
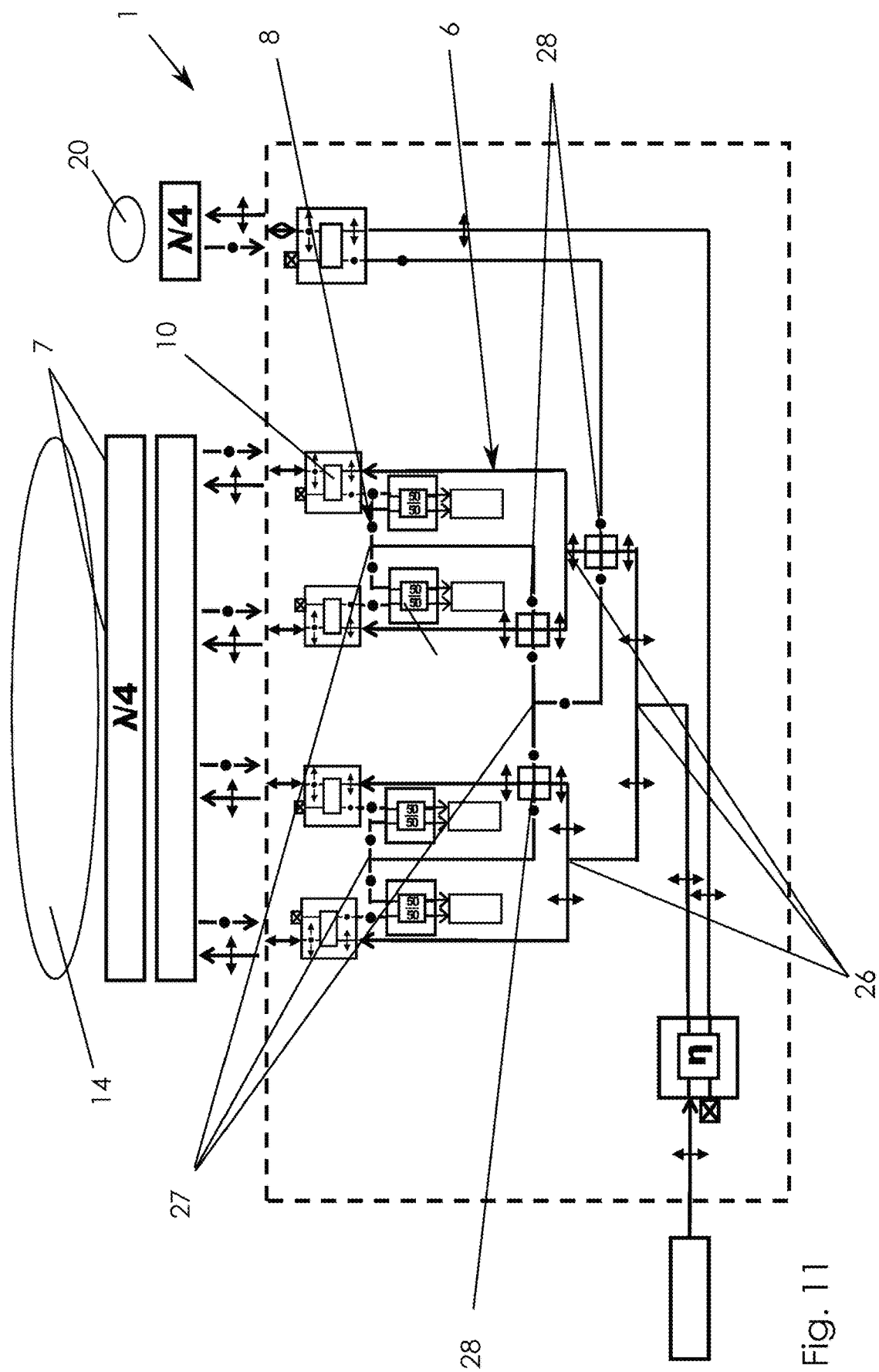
FIG. 11 schematically another exemplary embodiment of the system with four sample interfaces, with adjacent integrated sample-side polarization beam splitters provided in a mirrored arrangement.

FIG. 11 shows another advantageous embodiment of the system 1 with more than one sample interfaces 7 similar to the one shown in FIG. 10. It differs from the one shown in FIG. 10 in particular by the alignment of the sample-side polarization beam splitters 10, which are in mirrored arrangement. I.e. the inputs from the respective forward sample light paths 6 and the respective backward sample light paths 8 are mirrored pairwise for sample-side polarization beams splitters 10 of sample light paths 2 of adjacent sample interfaces 7. Also, the placement of the reference-side polarization beam splitters 18 is different. These changes allow a reduction of the number of waveguide crossings 28, which here is three. Thus, the amount of crosstalk is even further reduced, the arrangement is overall more compact allowing for a smaller distance between adjacent sample interfaces 2 (or channels), at a smaller total length of waveguides, and the image quality is further improved.

Figure 12:
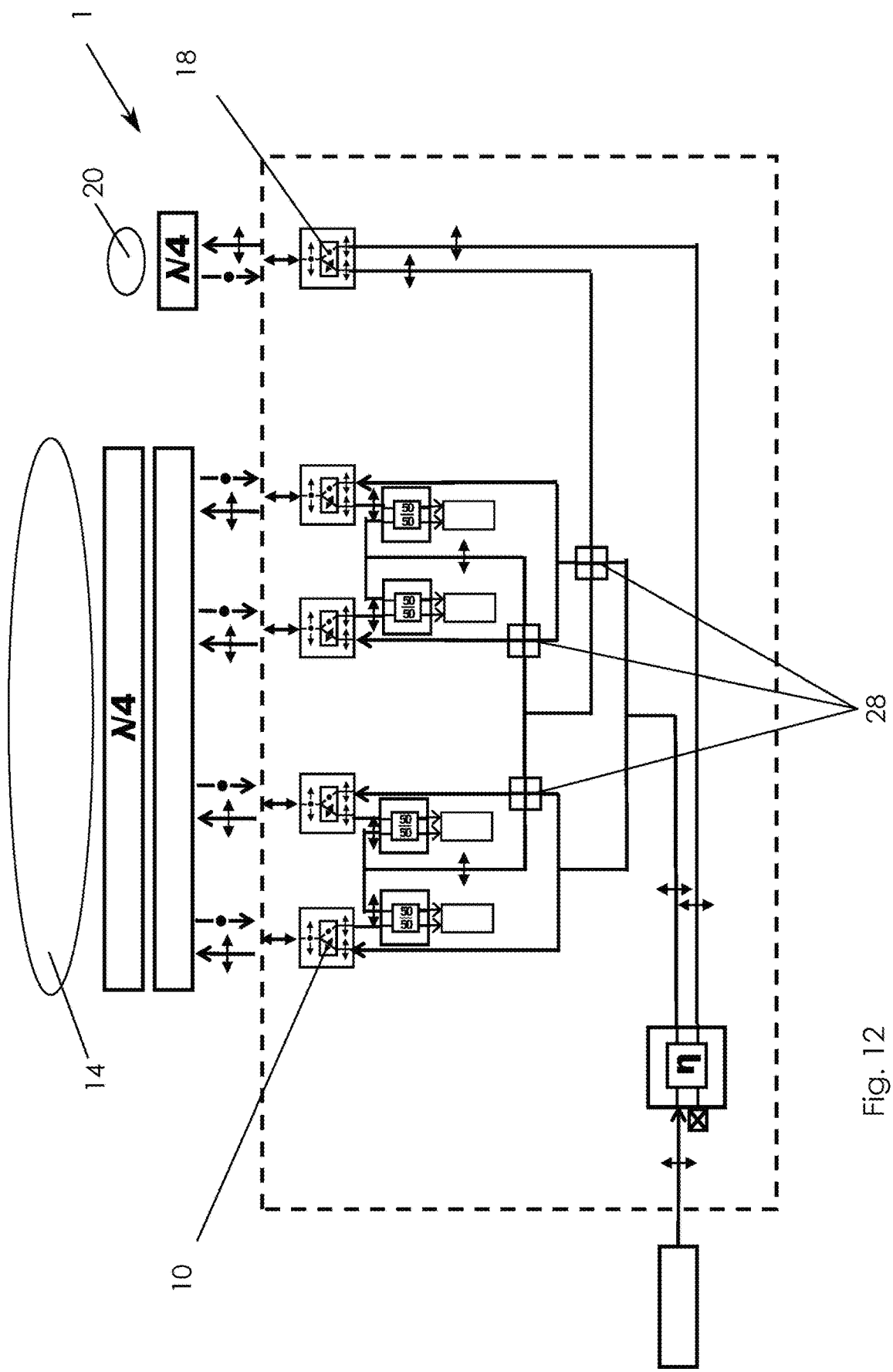
FIG. 12 schematically another exemplary embodiment of the system with four sample interfaces similar to FIG. 11, with combined sample-side polarization splitter rotators and a combined reference-side polarization splitter rotator.

FIG. 12 shows another preferable embodiment of the system 1 with more than one sample interface 7, similar to the one shown in FIG. 11. Therein, the sample-side polarization beam splitters 10 are polarization splitter rotators and the reference-side polarization beam splitter 18 is a polarization splitter rotator. I.e., both the sample-side polarization beam splitters 10 and the reference-side polarization beam splitter 18 are provided as polarization splitter rotators. Thus, the light beams have the same polarization at the waveguide crossings 28. However, maintaining the same polarization makes it easier to compensate dispersion on the photonics integrated circuit 9 with equal path lengths. Further, the same polarization may be preferable for longer propagation lengths due to lower losses. Also, this embodiment is particularly easy to implement and is particularly compact.

Figure 13:
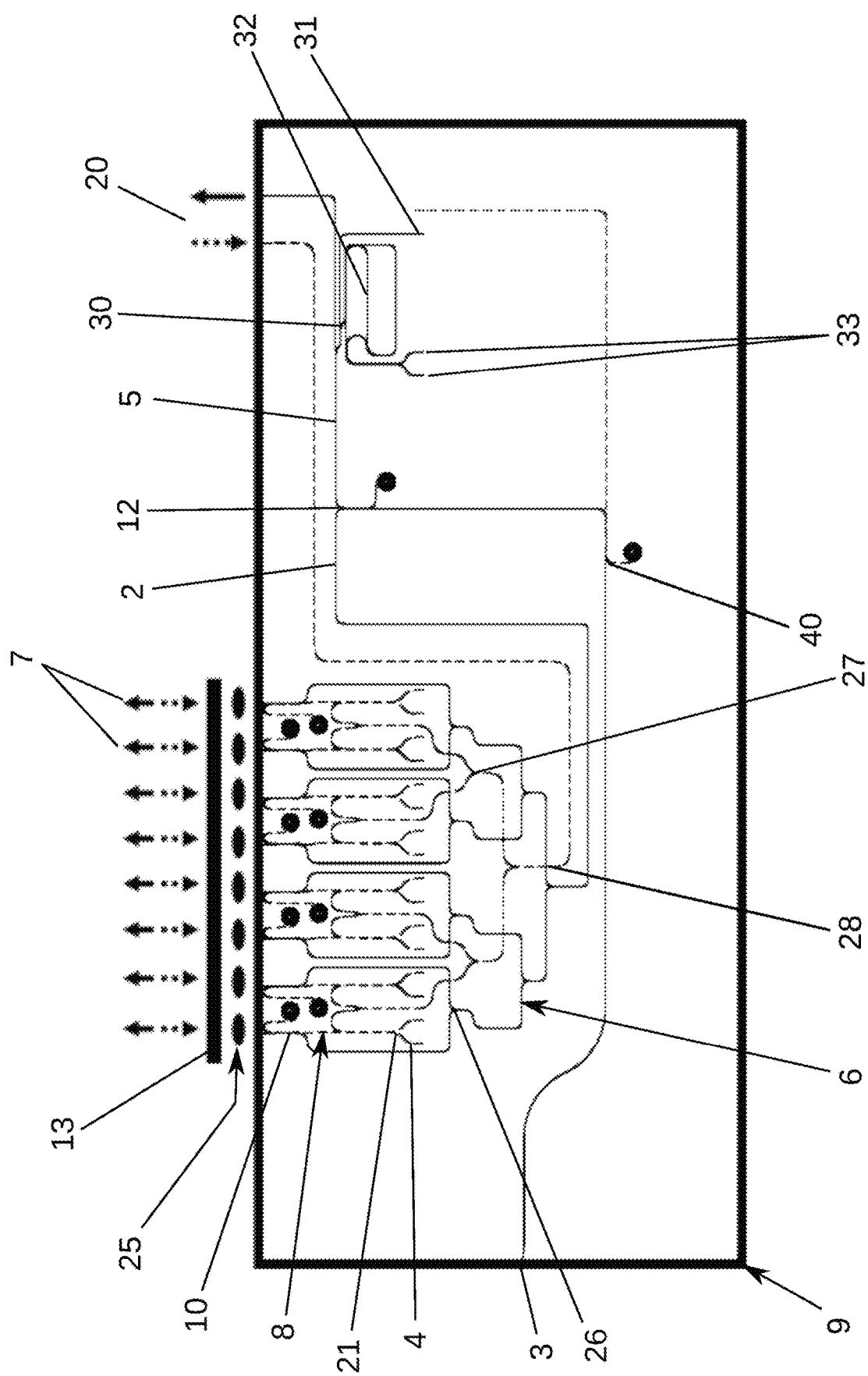
FIG. 13 schematically an exemplary embodiment of the system with eight sample interfaces.

FIG. 13 shows a preferable embodiment of the system 1 with eight sample interfaces 7, wherein the system 1 is an SS-OCT system. It will be readily apparent to the skilled person, that the present invention also covers other numbers of channels (in particular between 1 and 100 channels, preferably any even number of channels, e.g. 2, 4, 6, 10, 12, 14 or 16 channels) in a similar fashion. The source interface 3 is a spot size converter (inverted taper) for fibre-to-PIC (photonic integrated circuit 9) coupling, wherein the end facets can comprise an anti-reflection measure, e.g. a specific coating and/or an angled end facet and/or angled waveguides to reduce reflections back into the fiber. The same are used for coupling the reference beam to and from the reference 20. The sample interfaces and the reference interface are arranged on the same side of the photonic integrated circuit 9: It can be advantageous to avoid parts of the electronic layout below due to thermal concerns or sometimes end facets are not accessible due to lower lying metals. There are a separate input and output for the reference beam, i.e. the desired reference beam is one-directional in the whole reference light path.

The waveguides are indicated as solid lines or (essentially) dashed lines to approximately illustrate the different polarization of the light propagated during operation. The widths of specific sections of the waveguides for TE-like and TM-like propagation can be adjusted to compensate wavelength dependent dispersion. For example, the widths of the waveguides—for TE-like propagation (waveguides indicated by solid lines), i.e. of the forward sample light paths 6 (at least between the source interface 3 and the sample-side polarization beam splitter 10) and the reference light path 5 between the source interface 3 and the point at which the light beam is coupled out of the photonic integrated circuit 9 to the reference 20, and—for TM-like propagation (waveguides indicated by mostly dashed lines), i.e. of the backward sample light paths 8 (at least between the sample-side polarization beam splitter 10 and the detector interface 4) and the reference light paths 5 between the point at which the light beam is coupled into the photonic integrated circuit 9 from the reference 20 and the detector interface 4, can be adjusted such that the wavelength dependent dispersion is more similar between these two different polarization modes. The sample beams are coupled out of and into the photonic integrated circuit 9 towards/from the sample interfaces 7 by spot size converters (inverted tapers), wherein the end facets can comprise an anti-reflection measure, e.g. a specific coating and/or an angled end facet. There is a spacing between individual sample light paths 2 outputs from the photonic integrated circuit 9, i.e. between individual OCT engine unit cells. Outside the photonic integrated circuit 9 the sample light paths 6, 8 traverse first a microlens array 25, with one lens associated with each channel, and then a common sample-side polarization changing element 13 formed by a quarter wave plate. The microlens array 25 may be replaced with a smaller number of lenses, at least some of which are shared between at least two channels, or even with a single lens shared between all channels. Waveguide to photodiode couplers couple the beams to the detectors at the detector interfaces 4.

The sample beam splitters 26 and reference beam splitters 27 are broadband 1×2 50:50 couplers. The output couplers 21 are broadband 2×2 50:50 couplers for TM polarized light beams. The sample-side polarization beam splitters 10 are broadband 2×2 polarization beam splitters, of which one output is connected to a waveguide terminator, e.g. a spiral (schematically indicated in FIG. 13) or an inverted taper, terminating light coupled to the associated port of the sample-side polarization beam splitter 10. There are seven low-crosstalk waveguide crossings 28. The sample-side polarization beam splitters 10 are provided in mirrored arrangement as described in more detail in connection with FIG. 11.

There is provided for an interposed polarization beam splitter 40 in the reference light paths 5 and the sample light paths 2 (at a point at which all of them still overlap). The reference light paths 5 and the sample light paths 2 are guided to a first input of the interposed polarization beam splitter 40. Its second input is connected to a waveguide terminator. The interposed polarization beam splitter 40 splits off the TM-like polarized component of light coming from the source interface 3 at its first output. This TM-like polarized component is guided to a detector. The reference light paths 5 and the sample light paths 2 continue along its second output. Subsequently, the reference light paths 5 are split from the sample light paths 2 by the input beam splitter 12, in particular a broadband 2×2 90:10 coupler for TE polarization, wherein 10% of the intensity is directed towards the reference light paths and 90% of the intensity is directed toward the sample light paths 2. The input beam splitter's 12 second output leads to a waveguide terminator. Thereafter, the sample light paths 2 continue in the direction of the respective sample interfaces 7 and the reference light paths 5 continue in the direction of the reference 20.

There is a path split off the reference light path 5 between the input beam splitter 12 and the reference 20. This path leads to a power splitter 30, the outputs of which lead to a k-clock MZI 32 and a power monitoring detector interface

31. The k-clock comprises a broadband 2×2 50:50 coupler leading to two balanced detectors 33. The k-clock produces an interferometric signal which monitors the wavelength supplied by the swept source (not shown). This is required for the post processing of the interference OCT signal. The power monitor can be used for example during a medical treatment to record the power emitted at the power monitoring detector interface 31, which is a fixed proportion to the power emitted at the sample interfaces. Monitoring and integrating the total emitted power help to limit risks associated with the medical treatment. Depending on the number of channels, the waveguide propagation losses, the photodiode sensitivities, the coupling losses and the back-scattering strength of the sample other splitting ratios can be used for the input beam splitter 12 and the power splitter 30 in front of the k-clock and power monitoring path as well as the power splitting ratio between k-clock and power monitor.

The dimensions of the photonic integrated circuit could be less than 50 mm times 50 mm, optionally less than 20 mm times 20 mm, e.g. 12 mm times 5 mm.

The invention claimed is:

1. A time-domain or frequency domain system, comprising:
 a sample light path between a source interface and a detector interface;
 a reference light path between the source interface and the detector interface; and
 a photonic integrated circuit;
 wherein the reference light path is at least partially separate from the sample light path;
 wherein the sample light path comprises a forward sample light path between the source interface and a sample interface, and a backward sample light path between the sample interface and the detector interface;
 wherein the forward sample light path and the backward sample light path are at least partially provided by the photonic integrated circuit; and
 the photonic integrated circuit comprises an integrated sample-side polarization beam splitter arranged in the forward sample light path and the backward sample light path;
 wherein the system comprises at least two detector interfaces and a corresponding number of sample light paths between the source interface and the respective detector interface as well as a corresponding number of reference light paths between the source interface and the respective detector interface, wherein the photonic integrated circuit comprises at least one integrated sample beam splitter to split the sample light paths between the source interface and the detector interfaces and at least one integrated reference beam splitter to split the reference light paths between the source interface and the detector interfaces.

2. The system according to claim 1, wherein the photonic integrated circuit comprises an integrated input beam splitter arranged in the forward sample light path and in the reference light path.

3. The system according to claim 1, wherein it further comprises a sample-side polarization changing element for rotating the polarization axis of linearly polarized light by 90° after a forward and backward pass, wherein the sample-side polarization changing element is arranged in the forward sample light path and the backward sample light path between the integrated sample-side polarization beam splitter and the sample interface.

4. The system according to claim 1, wherein the reference light path comprises a forward reference light path between the source interface and a reference interface, and a backward reference light path between the reference interface and the detector interface, and wherein the photonic integrated circuit further comprises an integrated reference-side polarization beam splitter arranged in the forward reference light path and the backward reference light path.

5. The system according to claim 4, wherein it further comprises a reference-side polarization changing element for rotating the polarization axis of linearly polarized light by 90° after a forward and backward pass, wherein the reference-side polarization changing element is arranged in the forward reference light path and the backward reference light path between the integrated reference-side polarization beam splitter and the reference interface.

6. The system according to claim 1, wherein the photonic integrated circuit comprises an integrated broadband output coupler arranged in the backward sample light path and in the reference light path.

7. The system according to claim 6, wherein the photonic integrated circuit comprises an integrated photodetector at the detector interface.

8. The system according to claim 1, wherein each of the number of reference light paths comprises a forward reference light path between the source interface and a reference interface, and a backward reference light path between the reference interface and the respective one of the detector interfaces, and wherein the photonic integrated circuit further comprises an integrated reference-side polarization beam splitter arranged in the forward reference light path and the backward reference light path of the number of reference light paths, and wherein the reference light paths share the same reference interface, wherein the at least one integrated reference beam splitter is arranged between the reference interface and the detector interfaces.

9. The system according to claim 1, wherein the reference light paths are integrated on the photonic integrated circuit between the source interface and the respective detector interface;
 wherein the photonic integrated circuit comprises a reference-side polarization rotating element for rotating one polarization eigenmode by 90° into the orthogonal polarization eigenmode arranged in the reference light paths;
 wherein the reference light paths share the same reference-side polarization rotating element, wherein the at least one integrated reference beam splitter is arranged between the reference-side polarization rotating element and the detector interfaces.

10. The system according to claim 1, wherein the at least one integrated sample beam splitter and the at least one integrated reference beam splitter are configured for orthogonal polarization modes.

11. The system according to claim 1, wherein at least two of the integrated sample-side polarization beam splitters arranged in the sample light paths are provided in a mirrored arrangement.

12. A time-domain or frequency domain system, comprising:
 a sample light path between a source interface and a detector interface;
 a reference light path between the source interface and the detector interface; and
 a photonic integrated circuit;
 wherein the reference light path is at least partially separate from the sample light path;
 wherein the sample light path comprises a forward sample light path between the source interface and a sample interface, and a backward sample light path between the sample interface and the detector interface;

wherein the forward sample light path and the backward sample light path are at least partially provided by the photonic integrated circuit; and the photonic integrated circuit comprises an integrated sample-side polarization beam splitter arranged in the forward sample light path and the backward sample light path;

the reference light path is integrated on the photonic integrated circuit between the source interface and the detector interface; and wherein the photonic integrated circuit comprises a sample-side polarization rotating element for rotating one polarization eigenmode by 90° into the orthogonal polarization eigenmode arranged in the backward sample light path between the integrated sample-side polarization beam splitter and the detector interface or in the forward sample light path between the source interface and the sample-side polarization beam splitter or characterized in that the sample-side polarization beam splitter is a polarization splitter rotator.

13. A time-domain or frequency domain system, comprising:

a sample light path between a source interface and a detector interface;

a reference light path between the source interface and the detector interface; and a photonic integrated circuit;

wherein the reference light path is at least partially separate from the sample light path;

wherein the sample light path comprises a forward sample light path between the source interface and a sample interface, and a backward sample light path between the sample interface and the detector interface;

wherein the forward sample light path and the backward sample light path are at least partially provided by the photonic integrated circuit;

wherein the photonic integrated circuit comprises an integrated sample-side polarization beam splitter arranged in the forward sample light path and the backward sample light path;

wherein the reference light path is integrated on the photonic integrated circuit between the source interface and the detector interface;

wherein the photonic integrated circuit comprises a reference-side polarization rotating element for rotating one polarization eigenmode by 90° into the orthogonal polarization eigenmode arranged in the reference light path.

* * * * *